United States Patent
Ohta et al.

(10) Patent No.: US 8,702,218 B2
(45) Date of Patent: Apr. 22, 2014

(54) AQUEOUS INK COMPOSITION AND PRINTING PROCESS BY INK JET RECORDING SYSTEM USING THE COMPOSITION

(75) Inventors: Hitoshi Ohta, Shiojiri (JP); Yoshimasa Tamura, Kashiwa (JP)

(73) Assignee: Seiko Epson Corporation, Tokyo (JP)

( * ) Notice: Subject to any disclaimer, the term of this patent is extended or adjusted under 35 U.S.C. 154(b) by 338 days.

(21) Appl. No.: 13/069,904

(22) Filed: Mar. 23, 2011

(65) Prior Publication Data

US 2011/0234682 A1  Sep. 29, 2011

(30) Foreign Application Priority Data

Mar. 23, 2010 (JP) ................. 2010-066489
Mar. 23, 2010 (JP) ................. 2010-066499
Mar. 23, 2010 (JP) ................. 2010-066520

(51) Int. Cl.
*B41J 2/01* (2006.01)

(52) U.S. Cl.
USPC ........................................... 347/100; 347/95

(58) Field of Classification Search
USPC ......... 347/95, 96, 101, 100, 102, 103, 88, 99, 347/21, 20, 9; 16/31.6, 31.13, 31.27; 523/160, 161
See application file for complete search history.

(56) References Cited

U.S. PATENT DOCUMENTS

| | | | |
|---|---|---|---|
| 5,609,671 A | | 3/1997 | Nagasawa |
| 5,626,655 A | * | 5/1997 | Pawlowski et al. ........... 347/100 |
| 5,928,419 A | | 7/1999 | Uemura et al. |
| 5,976,233 A | | 11/1999 | Osumi et al. |
| 6,087,416 A | * | 7/2000 | Pearlstine et al. ........... 523/160 |
| 6,123,759 A | | 9/2000 | Mise et al. |
| 6,136,286 A | | 10/2000 | Okuyama et al. |
| 6,737,449 B1 | * | 5/2004 | Yatake ........................ 106/31.6 |
| 2005/0176847 A1 | | 8/2005 | Cagle |
| 2007/0219290 A1 | * | 9/2007 | Sarkisian et al. ............. 523/160 |
| 2009/0233063 A1 | | 9/2009 | Yatake et al. |
| 2009/0295847 A1 | | 12/2009 | Mukai et al. |

FOREIGN PATENT DOCUMENTS

| | | | |
|---|---|---|---|
| EP | 1544261 A1 | 6/2005 | |
| EP | 2223972 A2 | 9/2010 | |
| JP | 56-28256 A | 3/1981 | |
| JP | 356573 A | 3/1991 | |
| JP | 3-79678 A | 4/1991 | |
| JP | 03160068 A | 7/1991 | |
| JP | 4-18462 A | 1/1992 | |
| JP | 04-356570 A | 12/1992 | |
| JP | 7-258578 A | 10/1995 | |
| JP | 8-3498 A | 1/1996 | |
| JP | 8-283596 A | 10/1996 | |
| JP | 10-110110 A | 4/1998 | |
| JP | 10-110111 A | 4/1998 | |
| JP | 10-110114 A | 4/1998 | |
| JP | 10-120958 A | 5/1998 | |
| JP | 10-195331 A | 7/1998 | |
| JP | 10-195360 A | 7/1998 | |
| JP | 10-237349 A | 9/1998 | |
| JP | 10-330665 A | 12/1998 | |
| JP | 2000-44858 A | 2/2000 | |
| JP | 2005-220352 A | 8/2005 | |
| JP | 2009-235155 A | 10/2009 | |
| JP | 2009235155 A | * 10/2009 | ................. B41J 2/01 |
| JP | 2009-262334 A | 11/2009 | |
| JP | 2010-006062 A | 1/2010 | |

OTHER PUBLICATIONS

Search Report of related European Patent Application No. 11 158 980.0 dated Aug. 16, 2011.

* cited by examiner

*Primary Examiner* — Manish S Shah
(74) *Attorney, Agent, or Firm* — Nutter McClennen & Fish LLP; John J. Penny, V.

(57) ABSTRACT

The aqueous ink composition according to the invention includes at least a water-insoluble coloring agent, a glycol ether having an HLB value calculated by a Davies' method in the range of 4.2 to 8.0, a 1,2-alkyldiol having 4 to 8 carbon atoms, resin particles, and water.

13 Claims, No Drawings

AQUEOUS INK COMPOSITION AND PRINTING PROCESS BY INK JET RECORDING SYSTEM USING THE COMPOSITION

BACKGROUND

1. Technical Field

The present invention relates to an aqueous ink composition and a printing process by an ink jet system using the composition.

2. Related Art

A printing process by an ink jet recording system is performed by letting ink droplets fly and attach to a recording medium such as paper. Because of recent innovative progress in ink jet recording technology, the printing process employing the ink jet recording system has been also used in the field of highly fine image recording (image printing), which was ever achieved only by photograph or offset printing. Accordingly, there are demands for high-quality printed matters formed not only on plain paper and exclusive paper for ink jet recording (e.g., matte paper and gloss paper), which are usually used, but also on non-ink-absorbing or low-ink-absorbing recording media such as printing paper, synthetic paper, and films.

Many ink compositions that give high-quality images on plain paper or exclusive paper for ink jet recording have been proposed. Specifically proposed is an ink composition composed of at least a pigment coated with a water-insoluble polymer, a specific glycol ether, and a 1,2-alkyldiol (see JP-A-2009-235155).

Recently, instead of solvent-based pigment inks, which have been used for film recording media such as polyvinyl chloride materials, that is, non-ink-absorbing recording media, aqueous inks have been used from the viewpoints of safety and protection of the environment. As an example using such an aqueous ink, specifically proposed is a method of printing on a hydrophobic surface using an ink containing water, a glycol solvent, an insoluble coloring agent, a polymer dispersing agent, a silicone surfactant, a fluorinated surfactant, a water-insoluble graft copolymer binder, and N-methylpyrrolidone (see JP-A-2000-44858). Furthermore, a polymer colloid-containing aqueous ink jet ink composed of an aqueous liquid vehicle containing a volatile co-solvent having a boiling point of 285° C. or lower, acid-functionalized polymer colloid particles, and a pigment coloring agent for printing on non-porous base materials is proposed (see JP-A-2005-220352).

However, the printing quality of the image formed on a recording medium by the proposed ink or printing process using such an ink is not sufficiently excellent. Accordingly, there have been demands for an ink composition that has been further improved in the characteristics described above and a printing process using the ink composition. Specifically, a phenomenon of color mixture between different colors or spreading of ink to a non-desired area (this phenomenon is referred to as "bleeding") occurs, or a phenomenon that a solid image has thick areas and thin areas of ink (this phenomenon is referred to as "uneven ink density") occurs, thus, in known ink compositions and printing processes using the known ink compositions, desired printing quality has not been obtained. Furthermore, in aqueous inks that have been proposed, the abrasion resistance of printed matters formed on non-ink-absorbing or low-ink-absorbing recording media is not sufficiently excellent. Accordingly, there has been a demand for a printing process by an ink jet recording system to obtain printed matters that are more excellent in abrasion resistance.

SUMMARY

An advantage of some aspects of the invention is to provide an aqueous ink composition suitable for a printing process of forming an image on a recording medium by an ink jet recording system, wherein the aqueous ink composition can form images excellent in printing quality and abrasion resistance on various recording media, in particular, on non-ink-absorbing or low-ink-absorbing recording media, and another advantage of some aspects of the invention is to provide a printing process by an ink jet recording system using the aqueous ink composition and giving printed matters that are low in bleeding and uneven ink density to show excellent printing quality.

Furthermore, an advantage of some aspects of the invention is to provide a printing process of forming images on non-ink-absorbing or low-ink-absorbing recording media by an ink jet recording system, the printing process by an ink jet recording system can give printed matters low in bleeding and uneven ink density to show excellent printing quality and also excellent in abrasion resistance.

The aqueous ink composition according to an aspect of the invention includes at least a water-insoluble coloring agent, a glycol ether having an HLB value calculated by a Davies' method in the range of 4.2 to 8.0, a 1,2-alkyldiol having 4 to 8 carbon atoms, resin particles, and water.

In the aqueous ink composition according to an aspect of the invention, the alkyl group of the glycol ether preferably has a branched structure.

In the aqueous ink composition according to an aspect of the invention, the amount of the glycol ether is preferably in the range of 0.1 to 6 mass % based on the total amount of the aqueous ink composition.

In the aqueous ink composition according to an aspect of the invention, the mass ratio of the 1,2-alkyldiol to the glycol ether is preferably in the range of 0.5:1 to 5:1.

In the aqueous ink composition according to an aspect of the invention, the amount of the 1,2-alkyldiol is preferably in the range of 0.5 to 20 mass % based on the total amount of the aqueous ink composition.

In the aqueous ink composition according to an aspect of the invention, the alkyl group of the glycol ether is preferably a 2-ethylhexyl group.

The aqueous ink composition according to an aspect of the invention preferably further includes a nonionic surfactant.

In the aqueous ink composition according to an aspect of the invention, the nonionic surfactant is preferably a silicone-based surfactant and/or an acetylene glycol-based surfactant.

The aqueous ink composition according to an aspect of the invention preferably further includes a pyrrolidone derivative.

The aqueous ink composition according to an aspect of the invention preferably further includes a polyol.

The aqueous ink composition according to an aspect of the invention preferably further includes a pyrrolidone resin derivative.

The printing process by an ink jet recording system according to an aspect of the invention uses the aqueous ink composition according to any one of the above aspects and includes at least a first step of discharging droplets of the aqueous ink composition on a recording medium to form an image.

The printing process by an ink jet recording system according to an aspect of the invention preferably includes a second step of drying the aqueous ink composition on the recording medium at least either during or after the first step.

In the printing process by an ink jet recording system according to an aspect of the invention, the recording medium is preferably a non-ink-absorbing or low-ink-absorbing recording medium.

In the printing process by an ink jet recording system according to an aspect of the invention, the second step preferably includes a step of heating the recording medium at 40 to 80° C. and/or a step of blowing air having a temperature of 40 to 80° C. to the aqueous ink composition on the recording medium.

DESCRIPTION OF EXEMPLARY EMBODIMENTS

Preferred embodiments according to aspects of the invention will be described in detail below.

1. Aqueous Ink Composition

The aqueous ink composition of the invention includes at least a water-insoluble coloring agent, a glycol ether having an HLB value calculated by a Davies' method in the range of 4.2 to 8.0, a 1,2-alkyldiol having 4 to 8 carbon atoms, resin particles, and water.

Furthermore, in order to improve applicability of the aqueous ink composition to various recording media, in particular, to non-ink-absorbing or low-ink-absorbing recording media, the aqueous ink composition of the invention preferably further includes a nonionic surfactant, a pyrrolidone derivative, a pyrrolidone resin derivative, and/or a polyol other than 1,2-alkyldiols having 4 to 8 carbon atoms, in addition to the above-mentioned components.

These structural materials will be described in detail below.

1.1. Coloring Agent

The aqueous ink composition of the invention contains a water-insoluble coloring agent. Examples of the water-insoluble coloring agent include water-insoluble dyes and pigments, but pigments are preferred. Pigments are not only insoluble or hardly soluble in water but also have properties of being hardly faded by light, gas, and so on. Therefore, the printed matter printed by the ink composition containing a pigment is excellent in, for example, water resistance, gas resistance, and light resistance and has satisfactory storage stability.

As the pigment, any of known inorganic pigments, organic pigments, and carbon black can be used. Among them, carbon black and organic pigments are preferred from the viewpoints of good color-developing properties and low specific gravities to be hardly precipitated when dispersed.

In the invention, preferred specific examples of the carbon black include furnace black, lamp black, acetylene black, and channel black (C.I. Pigment Black 7), and commercially available examples thereof include No. 2300, 900, MCF88, No. 20B, No. 33, No. 40, No. 45, No. 52, MA7, MA8, MA100, and No. 2200B (the mentioned above are all trade names, manufactured by Mitsubishi Chemical Corp.), Color Black FW1, FW2, FW2V, FW18, FW200, S150, S160, and S170, Printex 35, U, V, and 140U, and Special Black 6, 5, 4A, 4, and 250 (the mentioned above are all trade names, manufactured by Degussa Corp.), Conductex SC, Raven 1255, 5750, 5250, 5000, 3500, 1255, and 700 (the mentioned above are all trade names, manufactured by Columbian Chemicals Co.), Regal 400R, 330R, and 660R, Mogul L, Monarch 700, 800, 880, 900, 1000, 1100, 1300, and 1400, and Elftex 12 (the mentioned above are all trade names, manufactured by Cabot Corp.). These are merely examples of carbon blacks suitable for the invention, and the invention is not limited to these examples. These carbon blacks may be used alone or as a mixture of two or more thereof. The content of the carbon black is 0.5 to 20 mass %, preferably 1 to 10 mass %, based on the total amount of the black ink composition.

Examples of the organic pigment that is preferably used in the invention include quinacridone pigments, quinacridonequinone pigments, dioxadine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolon pigments, isoindolinone pigments, azomethine pigments, and azo pigments.

Specific examples of the organic pigment that is used in the aqueous ink composition of the invention are shown below.

Examples of the pigment contained in a cyan ink composition include C.I. Pigment Blue 1, 2, 3, 15:3, 15:4, 15:34, 16, 22, and 60, and C.I. Vat Blue 4 and 60. Preferably, one or a mixture of two or more selected from the group consisting of C.I. Pigment Blue 15:3, 15:4, and 60 is used. The content of the pigment or pigments is about 0.5 to 20 mass %, preferably about 1 to 10 mass %, based on the total amount of the cyan ink composition.

Examples of the pigment contained in a magenta ink composition include C.I. Pigment Red 5, 7, 12, 48 (Ca), 48 (Mn), 57 (Ca), 57:1, 112, 122, 123, 168, 184, 202, and 209, and C.I. Pigment Violet 19. Preferably, one or a mixture of two or more selected from the group consisting of C.I. Pigment Red 122, 202, and 209, and C.I. Pigment Violet 19 is used. The content of the pigment or pigments is about 0.5 to 20 mass %, preferably about 1 to 10 mass %, based on the total amount of the magenta ink composition.

Examples of the pigment contained in a yellow ink composition include C.I. Pigment Yellow 1, 2, 3, 12, 13, 14C, 16, 17, 73, 74, 75, 83, 93, 95, 97, 98, 109, 110, 114, 128, 129, 138, 150, 151, 154, 155, 180, and 185. Preferably, one or a mixture of two or more selected from the group consisting of C.I. Pigment Yellow 74, 109, 110, 128, and 138 is used. The content of the pigment or pigments is about 0.5 to 20 mass %, preferably about 1 to 10 mass %, based on the total amount of the yellow ink composition.

As the pigment contained in an orange ink composition, for example, C.I. Pigment Orange 36 or 43 or a mixture thereof is used. The content of the pigment or pigments is about 0.5 to 20 mass %, preferably about 1 to 10 mass %, based on the total amount of the orange ink composition.

As the pigment contained in a green ink composition, for example, C.I. Pigment Green 7 or 36 or a mixture thereof is used. The content of the pigment or pigments is about 0.5 to 20 mass %, preferably about 1 to 10 mass %, based on the total amount of the green ink composition.

In order to apply the above-mentioned pigment to an aqueous ink composition, it is necessary that the pigment is stably dispersed and retained in water. Examples of the method for obtaining stable pigment dispersion include a method of dispersing a pigment using a resin dispersant such as a water-soluble resin and/or a water-dispersible resin (hereinafter, a pigment treated by this method is referred to as "resin-dispersed pigment"), a method of dispersing a pigment using a surfactant such as a water-soluble surfactant and/or a water-dispersible surfactant (hereinafter, a pigment treated by this method is referred to as "surfactant-dispersed pigment"), and a method of endowing a pigment with ability to be dispersed and/or dissolved in water by chemically/physically introducing a hydrophilic functional group to the pigment particle surface without using dispersants such as resins or surfactants (hereinafter, a pigment treated by this method is referred to as "surface-treated pigment"). The aqueous ink composition that is used in the printing process according to the embodiment can include any of the resin-dispersed pigment, the surfactant-dispersed pigment, and the surface-treated pigment and further can include a mixture thereof as necessary.

Examples of the resin dispersant used in the resin-dispersed pigment include polyvinyl alcohols, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-anhydrous maleic acid copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acrylic acid copolymers, and salts thereof. Among them, particularly preferred are copolymers of monomers having hydrophobic functional groups and monomers having hydrophilic functional groups, and polymers of monomers having both hydrophobic functional groups and hydrophilic functional groups. The form of the copolymers may be any of random copolymers, block copolymers, alternating copolymers, and graft copolymers.

The salts are, for example, salts with basic compounds such as ammonia, ethylamine, diethylamine, triethylamine, propylamine, isopropylamine, dipropylamine, butylamine, isobutylamine, diethanolamine, triethanolamine, triisopropanolamine, aminomethyl propanol, and morpholine. The addition amount of the basic compound is not particularly limited as long as it is not lower than neutralization equivalent of the resin dispersant.

The molecular weight of the resin dispersant is preferably in the range of 1000 to 100000, more preferably in the range of 3000 to 10000, as a weight-average molecular weight. When the molecular weight is within this range, the coloring agent can be stably dispersed in water, and, for example, viscosity control in the application to the aqueous ink composition is easy.

The acid number is preferably in the range of 50 to 300 and more preferably in the range of 70 to 150. When the acid number is within this range, stable dispersion of the coloring agent particles in water can be ensured, and printed matters printed with the aqueous ink composition prepared using such a resin dispersant can have high water resistance.

The resin dispersant mentioned above may be commercially available one, and specific examples thereof include Joncryl 67 (weight-average molecular weight: 12500, acid number: 213), Joncryl 678 (weight-average molecular weight: 8500, acid number: 215), Joncryl 586 (weight-average molecular weight: 4600, acid number: 108), Joncryl 611 (weight-average molecular weight: 8100, acid number: 53), Joncryl 680 (weight-average molecular weight: 4900, acid number: 215), Joncryl 682 (weight-average molecular weight: 1700, acid number: 238), Joncryl 683 (weight-average molecular weight: 8000, acid number: 160), and Joncryl 690 (weight-average molecular weight: 16500, acid number: 240) (the mentioned above are trade names, manufactured by BASF Japan Corp.).

Examples of the surfactant used in the surfactant-dispersed pigment include anionic surfactants such as alkanesulfonates, α-olefin sulfonates, alkylbenzene sulfonates, alkylnaphthalene sulfonates, acylmethyl taurates, dialkyl sulfosuccinates, alkyl sulfates, sulfated olefin, polyoxyethylene alkyl ether sulfates, alkyl phosphates, polyoxyethylene alkyl ether phosphates, and monoglyceride phosphates; amphoteric surfactants such as alkylpyridium salts, alkyl amino acid salts, and alkyl dimethyl betaine; and nonionic surfactants such as polyoxyethylene alkyl ether, polyoxyethylene alkyl phenylether, polyoxyethylene alkyl ester, polyoxyethylene alkyl amide, glycerin alkyl ester, and sorbitane alkyl ester.

The addition amount of the resin dispersant or the surfactant is preferably 1 to 100 parts by mass, more preferably 5 to 50 parts by mass, based on 100 parts by mass of the pigment. In this range, dispersion stability of the pigment in water can be ensured.

Examples of the hydrophilic functional group introduced to the surface-treated pigment include —OM, —COOM, —CO—, —$SO_3$M, —$SO_2NH_2$, $RSO_2$M, —$PO_3$HM, —$PO_3M_2$, —$SO_2$NHCOR, $NH_3$, and —$NR_3$ (in the formulae, M denotes a hydrogen atom, an alkali metal, ammonium, or organic ammonium; and R denotes an alkyl group having 1 to 12 carbon atoms, a phenyl group optionally having a substituent, or a naphthyl group optionally having a substituent). The functional group is physically and/or chemically introduced onto the pigment particle surface by being grafted directly and/or with a multivalent group. Examples of the multivalent group include alkylene groups having 1 to 12 carbon atoms, phenylene groups optionally having substituents, and naphthylene groups optionally having substituents.

The above-mentioned surface-treated pigment is preferably one prepared by treating a pigment particle surface with a treatment agent containing sulfur so that —$SO_3$M and/or —$RSO_2$M (M is a counter ion and denotes a hydrogen ion, an alkali metal ion, an ammonium ion, or an organic ammonium ion) chemically bonds to the pigment particle surface, that is, the pigment is dispersed in a solvent that does not have an active proton, does not have reactivity with sulfonic acid, and does not or hardly dissolve the pigment and is subsequently subjected to surface treatment with amidosulfuric acid or a complex of sulfur trioxide and tertiary amine so that —$SO_3$M and/or —$RSO_2$M chemically bonds to the particle surface to thereby make the pigment dispersible and/or soluble in water.

The surface treatment for grafting the functional group or its salt to the surfaces of the pigment particles directly or with a multivalent group can be performed by any of various known surface treatment procedures. Examples of the grafting procedure include a procedure of hydrophilizing the surface of commercially available oxidized carbon black by further oxidizing it with ozone or sodium hypochlorite solution (e.g., JP-A-7-258578, JP-A-8-3498, JP-A-10-120958, JP-A-10-195331, and JP-A-10-237349), a procedure of treating carbon black with 3-amino-N-alkyl substituted pyridium bromide (e.g., JP-A-10-195360 and JP-A-10-330665), a procedure of introducing a sulfone group to an organic pigment particle surface with a sulfonating agent by dispersing the organic pigment in a solvent that does not dissolve or hardly dissolve the organic pigment (e.g., JP-A-8-283596, JP-A-10-110110, and JP-A-10-110111), a procedure of introducing a sulfone group or a sulfone amino group to an organic pigment surface by dispersing the organic pigment in a basic solvent that forms a complex with sulfur trioxide and adding sulfur trioxide therein to treat the organic pigment surface (e.g., JP-A-10-110114), but the procedure is not limited these procedures.

One pigment particle may be grafted with one kind of functional group or a plurality of kinds of functional groups. The kind of functional group and its amount to be grafted may be appropriately determined depending on dispersion stability in the ink, color concentration, and the drying property at the front surface of an ink jet head.

The resin-dispersed pigment can be dispersed in water by mixing a pigment, water, and a resin dispersant, and also a water-soluble organic solvent, a neutralizer, and other components, as necessary, with a disperser that is commonly used, such as a ball mill, a sand mill, an attritor, a roll mill, an agitator mill, a Henshcel mixer, a colloid mill, an ultrasonic homogenizer, a jet mill, or an angmill. The surfactant-dispersed pigment can be similarly dispersed in water by mixing a pigment, water, and a surfactant, and above-mentioned other components as necessary with a disperser, and also the surface-treated pigment can be similarly dispersed in water by mixing a surface-treated pigment and water, and above-mentioned other components as necessary with a disperser. In these cases, the dispersion is preferably performed until the particle diameter of the pigment preferably becomes in the range of 20 to 500 nm, more preferably in the range of 50 to 200 nm, as the average diameter described above, for ensuring dispersion stability of the pigment in water.

1.2. Glycol Ether

The aqueous ink composition of the invention contains a glycol ether having an HLB value calculated by a Davies' method in the range of 4.2 to 8.0. When the aqueous ink composition contains the glycol ether having an HLB value within the range, the aqueous ink composition can have wettability and a permeation rate that are hardly influenced by the type of a recording medium and can form clear images having low uneven ink density, high color-developing properties, and low bleeding on various recording media. When the glycol ether is used in combination with a 1,2-alkyldiol (a 1,2-alkyldiol having 4 to 8 carbon atoms) having compatibility with glycol ethers, which will be described below, the affinity to water being the main solvent is increased without adversely affecting the dispersibility of the resin-dispersed pigment, the surfactant-dispersed pigment, and the surface-treated pigment. Therefore, the aqueous ink composition has excellent storage stability and is excellent in discharge stability of ink droplets in an ink jet recording system.

Herein, the HLB value of the glycol ether used in the invention is a value for evaluating hydrophilicity of a compound, advocated by Davies, et al., and is a numerical value determined by a Davies' method that is defined in, for example, a literature "J. T. Davies and E. K. Rideal, "Interface Phenomena", 2nd Ed. Academic Press, New York, 1963" and is a value calculated by the following Expression (1):

HLB value=7+Σ[1]+Σ[2]    Expression (1)

(wherein, [1] represents the number of hydrophilic groups, and [2] represents the number of hydrophobic groups).

Table 1 shows typical hydrophilic groups and hydrophobic groups and the numbers thereof.

TABLE 1

| Structure | Number of groups |
|---|---|
| —CH$_2$— | −0.475 |
| —CH$_3$ | −0.475 |
| —(CH$_2$CH$_2$O)— | +0.330 |
| —(CHCH$_2$O)—<br>\|<br>CH$_3$ | −0.150 |
| —OH | +1.900 |

The aqueous ink composition of the invention contains a glycol ether having an HLB value calculated by the Davies' method in the range of 4.2 to 8.0 as an essential component. The HLB value is preferably in the range of 4.2 to 8.0 and more preferably in the range of 4.2 to 7.1. When the HLB value is smaller than 4.2, the hydrophobicity of the glycol ether increases so as to decrease the affinity with water as the main solvent, which may result in a deterioration in ink storage stability. When the HLB value is larger than 8.0, the effects of wettability and permeability to a recording medium decrease, which may influence the printed image to cause, for example, a uneven ink density, bleeding, or to exhibit a low color developing property, and in particular, the effect of wettability to hydrophobic surfaces, non-ink-absorbing or low-ink-absorbing recording media, significantly decreases. Specific examples of the glycol ether include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These can be used alone or as a mixture of two or more thereof.

The aqueous ink composition of the invention preferably contains a glycol ether having a branched structure in its alkyl group. When the aqueous ink composition contains a glycol ether having a branched structure in its alkyl group, images low in uneven ink density and bleeding and excellent in color-developing property can be printed regardless of recording media, in particular, on non-ink-absorbing or low-ink-absorbing recording media. Specific examples of the glycol ether include ethylene glycol monoisobutyl ether, ethylene glycol monoisohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, and diethylene glycol mono-2-methylpentyl ether.

Furthermore, from the point of increasing the color developing property, the branched structure of the alkyl group of the glycol ether is more preferably a 2-methylpentyl group, a 2-ethylpentyl group, or a 2-ethylhexyl group, and most preferably a 2-ethylhexyl group. Specific examples of such glycol ethers include ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, and diethylene glycol mono-2-methylpentyl ether. Particularly preferred are ethylene glycol mono-2-ethylhexyl ether, diethylene glycol mono-2-ethylhexyl ether, and triethylene glycol mono-2-ethylhexyl ether.

The content of the glycol ether is preferably in the range of 0.1 to 6 mass % based on the total amount of the aqueous ink composition, from the viewpoints of a high color-developing property of the aqueous ink composition, an improvement in wettability, decreases in bleeding and uneven ink density, high ink storage stability, and discharging reliability. When the content is lower than 0.1 mass %, the wettability, permeability, and drying property of the aqueous ink composition are poor, and a clear image is hardly obtained. In addition, the printing concentration (color-developing property) may be insufficient. On the other hand, in a content of higher than 6 mass %, the viscosity of the ink increases, which may make the discharge of ink unstable, or the solubility of the glycol ether in the aqueous ink composition is insufficient, which may make the long-time storage unstable.

1.3. Resin Particles

The aqueous ink composition of the invention contains resin particles. The aqueous ink composition containing the resin particles can form an image having excellent abrasive resistance on a recording medium. In particular, when an image is printed using the aqueous ink composition containing the resin particles on a non-ink-absorbing or low-ink-absorbing recording medium such as a vinyl chloride film or a polypropylene film, the image can have more excellent abrasion resistance by performing a second step (drying step) in a preferred printing process, which will be described below. This is because that in the second step (drying step) in the preferred printing process described below, the resin particles function so as to solidify the ink and to firmly fix the solidified ink on a recording medium and that heating can further accelerate this function. In particular, the resin particles are preferably contained in the aqueous ink composition of the invention in a fine particle form (that is, an emulsion form or a suspension form). The aqueous ink composition containing the resin particles in a fine particle form can easily control its viscosity to an appropriate range for an ink jet recording system and can easily ensure storage stability and discharge stability. In addition, the resin particles contained in a fine particle form can prevent the coloring agent from aggregating at the time of the landing of ink on a recording medium and allow the formed image to have excellent printing quality.

The resin particles include polymer particles that mainly function so as to form a resin coating in the second step (drying step) in a preferred printing process described below and to fix a printed matter on a recording medium and also include wax particles that impart smoothness to the surface of the formed printed matter and improve abrasion resistance. The aqueous ink composition of the invention preferably contains both the polymer particles and the wax particles as the resin particles. The polymer particles and the wax particles will be described in detail below.

Examples of the component constituting the polymer particles include polyacrylate and its copolymer; polymethacrylate and its copolymer; polyacrylonitrile and its copolymer; polycyanoacrylate, polyacrylamide, polyacrylic acid, polymethacrylic acid, polyethylene, polypropylene, polybutene, polyisobutylene, polystyrene, and copolymers thereof; petroleum resins; chroman-indene resins; terpene resins; polyvinyl acetate and its copolymer; polyvinyl alcohols; polyvinyl acetals; polyvinyl ethers; polyvinyl chloride and its copolymer; polyvinylidene chloride; fluororesin; fluororubber; polyvinylcarbazole; polyvinylpyridine; polyvinylimidazole; polybutadiene and its copolymer; polychloroprene; polyisoprene; and natural resins. Among them, from the viewpoints of dispersibility of particles and wettability to recording media, those each having both a hydrophobic portion and a hydrophilic portion in its molecular structure are particularly preferred.

The polymer particles may be those obtained by a known method using a known material. For example, those disclosed in JP-B-62-1426, JP-A-3-56573, JP-A-3-79678, JP-A-3-160068, and JP-A-4-18462 may be used. In addition, those commercially available can be used, and examples thereof include Microgel E-1002 and Microgel E-5002 (the mentioned above are trade names, manufactured by Nippon Paint Co., Ltd.), Boncoat 4001 and Boncoat 5454 (the mentioned above are trade names, manufactured by Dainippon Ink & Chemicals, Inc.), SAE1014 (the mentioned above is a trade name, manufactured by Nippon Zeon Co., Ltd.), Saibinol SK-200 (the mentioned above is a trade name, manufactured by SAIDEN CHEMICAL INDUSTRY CO., LTD.), Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (the mentioned above are trade names, manufactured by BASF Japan Corp.).

The polymer particles can be prepared by the methods shown below and may be prepared by any of these methods or by combining a plurality of methods as necessary. Examples of the method include a method in which a polymerization catalyst (polymerization initiator) and a dispersant are mixed with a monomer of the component constituting desired polymer particles to perform polymerization (that is, emulsion polymerization); a method of obtaining particles by dissolving a polymer having a hydrophilic portion in a water-soluble organic solvent, mixing the resulting solution with water, and then removing the water-soluble organic solvent by, for example, distillation; and a method of obtaining particles by dissolving a polymer in a water-insoluble organic solvent and then mixing the resulting solution with an aqueous solution together with a dispersant. The above-described methods can be appropriately selected depending on the kind and the characteristics of the polymer to be used. The dispersant that can be used for dispersing the polymer into a fine particle form is not particularly limited, and examples thereof include anionic surfactants (e.g., sodium dodecylbenzenesulfonate, sodium laurylphosphate, and polyoxyethylene alkyl ether sulfate ammonium) and nonionic surfactants (e.g., polyoxyethylene alkyl ether, polyoxyethylene alkyl ester, polyoxyethylene sorbitane fatty acid ester, and polyoxyethylene alkyl phenyl ether). These can be used alone or as a mixture of two or more.

The above-described polymer particles preferably contain at least one structural component having a glass transition temperature (hereinafter referred to as "Tg") of not lower than room temperature (not lower than approximately 30° C.). The polymer particles containing a component having a Tg of not lower than room temperature show a high effect of forming a stronger resin coating in the second step (drying step) described below as a preferred printing process. Therefore, the abrasion resistance of printed matters is further increased. In addition, ink clogging at the nozzle tip of an ink jet head for an ink jet recording system hardly occurs. On the other hand, when polymer particles composed of only components having a Tg of lower than room temperature are used, a strong resin coating is hardly formed even if the second step (drying step) is performed as a preferred printing process described below, which may cause insufficient abrasion resistance of the printed matter. Furthermore, solidified ink may be formed at the nozzle tip to readily cause clogging.

Examples of the component constituting the wax particles include plant and animal waxes such as carnauba waxes, candelilla waxes, beeswax, rice waxes, and lanolin; petroleum waxes such as paraffin waxes, microcrystalline waxes, polyethylene waxes, oxidized polyethylene waxes, and petrolatum; mineral waxes such as montan waxes and ozokerite; synthetic waxes such as carbon waxes, Hoechst waxes, polyolefin waxes, and stearic acid amide; natural and synthetic wax emulsions such as α-olefin-anhydrous maleic acid copolymers; and wax mixtures. These may be used alone or as a mixture. Among them, preferred waxes are polyolefin waxes, in particular, polyethylene waxes and polypropylene waxes. Commercially available wax particles may be directly used, and examples thereof include Nopcoat PEM17 (trade name, manufactured by SAN NOPCO Limited), Chemipearl W4005 (trade name, manufactured by Mitsui Chemicals, Inc.), and AQUACER 515 and AQUACER 593 (trade names, manufactured by BYK-Chemie Japan, Inc.).

The average particle diameter of the resin particles is preferably in the range of 5 to 400 nm, more preferably in the range of 50 to 200 nm, from the viewpoints of ensuring storage stability and discharge stability of the aqueous ink composition.

The content of the resin particles is preferably in the range of 0.1 to 15 mass %, more preferably 0.5 to 10 mass %, in terms of solid content based on the total amount of the aqueous ink composition. When the content is in this range, the aqueous ink composition can be solidified and fixed even on a non-ink-absorbing or low-ink-absorbing recording medium by combining the aqueous ink composition of the invention and the second step (drying step) described below as a preferred printing process. When the content is lower than 0.1 mass %, the strength of the solidification and fixation of the ink are decreased, which may easily cause detachment of the ink from the recording medium surface. When the content is higher than 15 mass %, the storage stability and the discharge stability of the aqueous ink composition may not be ensured.

The reason why the abrasion resistance of a printed matter is increased by using both the polymer particles and wax particles as the resin particles has not been revealed yet, but it is assumed as follows. Since the component constituting the polymer particles has good affinity to a non-ink-absorbing or low-ink-absorbing recording medium and a water-insoluble coloring agent, the polymer particles firmly fix the coloring agent on the recording medium while wrapping the polymer particles, when a resin coating is formed in the second step (drying step). At the same time, the component of the wax particles is also present on the surface of the resin coating and has a property of decreasing the friction resistance of the resin coating surface. As a result, the formed resin coating is hardly abraded by friction from the outside and is hardly detached from the recording medium, and, therefore, the abrasion resistance of the printed matter is increased.

The content ratio of the polymer particles and the wax particles (polymer particles: wax particles) in the resin particles is preferably in the range of 1:1 to 5:1. Within this range, the above-described mechanism well works to increase the abrasion resistance of a printed matter.

1.4. 1,2-Alkyldiol Having 4 to 8 Carbon Atoms

The aqueous ink composition of the invention contains a 1,2-alkyldiol having 4 to 8 carbon atoms (hereinafter may be abbreviated to C4-8).

The C4-8 1,2-alkyldiol acts synergistically with the above-described glycol ether to further increase the wettability of the aqueous ink composition to a recording medium to uniformly wet the recording medium and to further increase the permeability of the aqueous ink composition. Therefore, the aqueous ink composition containing C4-8 1,2-alkyldiol can further decrease uneven ink density or bleeding of the ink. The C4-8 1,2-alkyldiol is excellent in compatibility with the glycol ether. Herein, the term "compatible" refers to, in the components constituting the aqueous ink composition, a combination of materials and proportions thereof that is determined such that a mixture of the glycol ether and the C4-8 1,2-alkyldiol is completely dissolved in the ink composition including water as the main solvent. The aqueous ink composition containing the C4-8 1,2-alkyldiol excellent in compatibility with the glycol ether can increase the solubility of the glycol ether in the aqueous ink composition and can realize improvements in storage stability and discharge stability of the ink. In addition, the content of the glycol ether in the aqueous ink composition can be easily increased, which can contribute to a further improvement in printing quality.

Examples of the C4-8 1,2-alkyldiol having such characteristics include 1,2-butanediol, 1,2-pentanediol, 1,2-hexanediol, 1,2-heptanediol, 1,2-octanediol, and 4-methyl-1,2-pentanediol. Among them, in particular, C6-8 (the number of carbon atoms is 6 to 8) 1,2-alkyldiols, such as 1,2-hexanediol, 1,2-heptanediol, and 1,2-octanediol, are preferred from the viewpoints of solubility in water and compatibility with the glycol ether.

The mass ratio of the C4-8 1,2-alkyldiol to the glycol ether is preferably in the range of 0.5:1 to 5:1, more preferably 1:2 to 1:5, from the view point of the compatibility with the glycol ether. In addition, the amount of the C4-8 1,2-alkyldiol is preferably in the range of 0.5 to 20 mass %, more preferably 1 to 8 mass %, based on the total amount of the aqueous ink composition from the viewpoints of compatibility with the glycol ether and of ensuring storage stability and discharge stability of the aqueous ink composition. When the content of the C4-8 1,2-alkyldiol is less than 0.5 mass %, the wettability of the aqueous ink composition to a recording medium may be decreased to cause uneven ink density and bleeding in a printed matter. On the other, in a content of higher than 20 mass %, it is difficult to adjust the viscosity of the aqueous ink composition within a range suitable for an ink jet recording system, which may easily cause unstable discharge or hardly ensure long-time storage stability of the aqueous ink composition. When the amount of the C4-8 1,2-alkyldiol is in the more preferable range of 1 to 8 mass %, since the evaporation and scattering rate of the C4-8 1,2-alkyldiol is sufficiently high, the drying rate of a printed matter is increased as a result of performing the second step (drying step), which will be described below, in the preferred printing process using the aqueous ink composition to improve the printing rate as a specific effect. In addition, there is no problem from a point of odor in the printing process.

1.5. Water

The aqueous ink composition of the invention contains water. The water is the main solvent of the aqueous ink composition and is a component that is evaporated and scattered in the second step (drying step) described below.

The water is preferably water from which ionic impurities are removed as much as possible, such as pure water, e.g., ion-exchanged water, ultrafiltration water, reverse osmosis water, or distilled water, or ultrapure water. Use of water that has been sterilized by, for example, UV irradiation or addition of hydrogen peroxide can prevent occurrence of molds or bacteria and is therefore preferred when the pigment dispersion and the aqueous ink composition containing the same are stored for a long time.

1.6. Other Preferred Structural Materials

The aqueous ink composition of the invention contains at least the above-described water-insoluble coloring agent, the glycol ether having an HLB value calculated by a Davies' method in the range of 4.2 to 8.0, the C4-8 1,2-alkyldiol, the resin particles, and water. In such a constitution, the aqueous ink composition can have wettability and a permeation rate that are hardly influenced by the type of a recording medium and can form clear printed images that are low in uneven ink density and bleeding, have high color-developing properties, and are also excellent in abrasion resistance on various recording media, in particular, on non-ink-absorbing or low-ink-absorbing recording media having hydrophobic surfaces. In addition, the aqueous ink composition is excellent in storage stability and also excellent in discharge stability of ink droplets in an ink jet recording system. In order to further improve these characteristics, the aqueous ink composition can further contain various materials described below.

1.6.1. Nonionic Surfactant

The aqueous ink composition of the invention preferably contains a nonionic surfactant. The nonionic surfactant has a function of uniformly spreading the aqueous ink composition on a recording medium. Therefore, the aqueous ink composition containing the nonionic surfactant has an effect of giving a clearer image with less uneven ink density and less bleeding. Examples of the nonionic surfactant having these effects include polyoxyethylene alkyl ether-based, polyoxypropylene alkyl ether-based, polycyclic phenyl ether-based, sorbitan derivative, fluorine-based, silicone-based, and acetylene glycol-based surfactants. Among them, silicone-based surfactants and acetylene glycol-based surfactants are excellent in the above-mentioned effects and excellent in compatibility and synergetic effects with the glycol ether and the C4-8 1,2-alkyldiol, which are essential components of the aqueous ink composition of the invention, and are therefore preferred.

1.6.1.1. Silicone-Based Surfactant

The aqueous ink composition of the invention preferably contains a silicone-based surfactant. The silicone-based surfactant is excellent in the function of uniformly spreading the ink on a recording medium not to cause uneven ink density or bleeding, compared to other nonionic surfactants. The silicone-based surfactant is also excellent in synergetic effects in compatibility and characteristics with the glycol ether and the C4-8 1,2-alkyldiol, which are essential components of the aqueous ink composition of the invention. The content of the silicone-based surfactant is preferably 1.5 mass % or less of the total amount of the aqueous ink composition. If the content of the silicone-based surfactant is higher than 1.5 mass %, the storage stability and the discharge stability of the aqueous ink composition may not be sufficiently ensured.

The silicone-based surfactants are preferably polysiloxane compounds such as polyether modified organosiloxane. More specifically, examples of the silicone-based surfactant include BYK-306, BYK-307, BYK-333, BYK-341, BYK-345, BYK-346, and BYK-348 (the mentioned above are trade names, manufactured by BYK-Chemie Japan, Inc.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the mentioned above are trade names, manufactured by Shin-Etsu Chemicals Co., Ltd.).

1.6.1.2. Acetylene Glycol-Based Surfactant

The aqueous ink composition of the invention preferably contains an acetylene glycol-based surfactant. The acetylene glycol-based surfactant is excellent in ability of appropriately retaining surface tension and interfacial tension, compared to other nonionic surfactants, and has a specific characteristic of hardly foaming. Therefore, the aqueous ink composition containing the acetylene glycol-based surfactant can appropriately retain the surface tension and the interfacial tension between the ink and a printer member that is in contact with the ink, such as the surface of a head nozzle. Therefore, when the aqueous ink composition is applied to an ink jet recording system, the discharge stability can be increased. In addition, the acetylene glycol-based surfactant has good wettability to a recording medium and functions as a penetrant, as in the glycol ether and the C4-8 1,2-alkyldiol. Therefore, the aqueous ink composition containing the acetylene glycol-based surfactant can print a highly fine image that hardly has uneven ink density and bleeding. The content of the acetylene glycol-based surfactant is preferably 1.0 mass % or less based on the total amount of the aqueous ink composition. If the content of the acetylene glycol-based surfactant is higher than 1.0 mass %, the storage stability and the discharge stability of the aqueous ink composition may not be sufficiently ensured.

Examples of the acetylene glycol-based surfactant include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (the mentioned above are trade names, manufactured by Air Products and Chemicals. Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (the mentioned above are trade names, manufactured by Nissin Chemical Industry Co., Ltd.), Acetyrenol E00, E00P, E40, and E100 (the mentioned above are trade names, manufactured by Kawaken Fine Chemicals Co., Ltd.).

1.6.2. Pyrrolidone Derivative

The aqueous ink composition of the invention preferably contains a pyrrolidone derivative. The pyrrolidone derivative has an effect of functioning as a good solubilizer or softener for resin components constituting the above-described resin particles. The pyrrolidone derivative also has a function of accelerating solidification and fixation of the ink on a non-ink-absorbing or low-ink-absorbing recording medium by accelerating formation of a coating by the resin particles during the drying of the ink. The content of the pyrrolidone derivative is preferably 10 mass % or less based on the total amount of the aqueous ink composition. If the content of the pyrrolidone derivative is higher than 10 mass %, the evaporation and scattering of the pyrrolidone derivative are insufficient even if the second step (drying step), which will be described below as a preferred printing process, is conducted, and, as a result, drying of the printed matter may be insufficient, or a problem of odor may occur.

Examples of the pyrrolidone derivative include low molecular compounds such as N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. Among them, 2-pyrrolidone is preferred from the viewpoints of ensuring storage stability of the aqueous ink composition, accelerating formation of a polymer particle coating, and its relatively low odor.

1.6.3. Polyol

The aqueous ink composition of the invention preferably contains a polyol. The polyol has a function of inhibiting drying and solidification of the ink at the nozzle surface of an ink jet head to prevent, for example, clogging and faulty discharge, and preferably has a high vapor pressure. This is because that it is desirable that the polyol is evaporated and scattered together with water in the second step (drying step) described below as a preferred printing process. The content of the polyol is preferably in the range of 20 mass % or less based on the total amount of the aqueous ink composition. Within this range, the polyol can exhibit the above-described effects. If the content is higher than 20 mass %, the evaporation and scattering of the polyol are insufficient even if the second step (drying step), which will be described below as a preferred printing process, is conducted, and, as a result, drying of the printed matter may be insufficient, or a problem of odor may occur.

Examples of the polyol include those other than the 1,2-alkyldiol having 4 to 8 carbon atoms, such as ethylene glycol, diethylene glycol, triethylene glycol, propylene glycol, dipropylene glycol, 1,3-propanediol, and 1,4-butanediol. Among them, ethylene glycol, diethylene glycol, triethylene glycol, propylene glycol, and dipropylene glycol are preferred from the viewpoints of their high vapor pressures and not inhibiting drying of the aqueous ink composition after printing.

1.6.4. Pyrrolidone Resin Derivative

The aqueous ink composition of the invention preferably contains a pyrrolidone resin derivative. The pyrrolidone resin derivative used in the invention is selected from those having water solubility. The aqueous ink composition containing the pyrrolidone resin derivative has characteristics that when droplets of the aqueous ink composition adhere to a recording medium, in particular, to a non-ink-absorbing film of, for example, polyvinyl chloride, polyethylene terephthalate, polyethylene, or polypropylene, the aqueous ink composition wets and spreads uniformly thereon to give a sharp and clear image hardly having uneven ink density and bleeding even if the image is a solid one. The reason thereof is not obvious, but is assumed that since the pyrrolidone structure contained in the molecular skeletal structure of the pyrrolidone resin derivative has high affinity to a film-type recording medium, the ink composition containing the pyrrolidone resin derivative is also improved in wettability to the film. In addition, since the pyrrolidone resin derivative is excellent in compatibility with the above-mentioned glycol ether and the 1,2-alkylenediol having 4 to 8 carbon atoms, even if the aqueous ink composition contains the pyrrolidone resin derivative, the aqueous ink composition of the invention can be excellent in both storage stability and discharge stability. Furthermore, the pyrrolidone resin derivative functions as a component of the coating after drying and therefore also contributes to an increase in abrasion resistance of the printed image.

As the pyrrolidone resin derivative, reagents or commercial products can be directly used, and specific examples of the reagent include polyvinylpyrrolidone K-15, polyvinylpyrrolidone K-30, polyvinylpyrrolidone K-60, polyvinylpyrrolidone K-90, and a poly(1-vinylpyrrolidone-co-vinyl acetate) copolymer (the mentioned above are trade names, manufactured by Tokyo Kasei Kogyo Co., Ltd.), and an N-vinylpyrrolidone/styrene copolymer and an N-vinylpyrrolidone/diethylaminomethyl methacrylate copolymer (the mentioned above are trade names, manufactured by Junsei Chemical Co., Ltd.). Specific examples of the commercial product include Luviskol K17 (polyvinylpyrrolidone), Luviskol K30 (polyvinylpyrrolidone), Luviskol K90 (polyvinylpyrrolidone), Luviskol VA73E (vinyl acetate-vinylpyrrolidone copolymer), Luviskol VA64P (vinyl acetate-vinylpyrrolidone copolymer), Luviskol VA55I (vinyl acetate-vinylpyrrolidone copolymer), Luviskol VA37E (vinyl acetate-vinylpyrrolidone copolymer), Luviskol VA37I (vinyl acetate-vinylpyrrolidone copolymer), Luviskol Plus (polyvinyl caprolactam), and Luviset Clear (vinylpyrrolidone/methacrylamide/vinylimidazole copolymer) (the mentioned above are trade names, manufactured by BASF Japan Corp.).

The addition amount of the pyrrolidone resin derivative can be a level that is necessary for giving desired characteristics to the aqueous ink composition of the invention, but is preferably in a range of 10 mass % or less, more preferably 0.1 to 10 mass %, and most preferably 1 to 2 mass %, based on the total amount of the aqueous ink composition. Within this range, the above-described characteristics can be provided to the aqueous ink composition, and the viscosity of the aqueous ink composition can be easily controlled to an appropriate range for an ink jet recording system.

1.7. Other Addition Components

The aqueous ink composition of the invention may further contain, for example, a permeation solvent, a humectant, an antiseptic/antifungal agent, a pH adjuster, and a chelating agent, in addition to the above-described preferred structural materials, in order to improve the characteristics of the aqueous ink composition.

The permeation solvent has a function of further improving the wettability of the aqueous ink composition to a recording medium to uniformly wet the medium. This can further reduce uneven ink density and bleeding in the formed image. Examples of the permeation agent include glycol ethers other than those having HLB values calculated by the Davies' method in the range of 4.2 to 8.0, and monovalent alcohols.

Examples of the glycol ether include diethylene glycol monopropyl ether, ethylene glycol monoisopropyl ether, diethylene glycol monoisopropyl ether, 1-methyl-1-methoxybutanol, and propylene glycol monomethyl ether.

Examples of the monovalent alcohol include water-soluble alcohols such as methanol, ethanol, n-propyl alcohol, isopropyl alcohol, 2,2-dimethyl-1-propanol, n-butanol, 2-butanol, tert-butanol, isobutanol, 2-methyl-1-butanol, 3-methyl-1-butanol, 3-methyl-2-butanol, n-pentanol, 2-pentanol, 3-pentanol, and tert-pentanol.

The content of the permeation solvent is preferably 10 mass % or less, more preferably 8 mass % or less, based on the total amount of the aqueous ink composition.

The humectant has a function of inhibiting evaporation of water in the aqueous ink composition to prevent aggregation of the solid contents, such as the pigment and the resin particles, in the ink. Examples of the humectant include glycerin, tetraethylene glycol, polyethylene glycol, polypropylene glycol, 1,5-pentanediol, 2,3-butanediol, 2-methyl-2,4-pentanediol, 2-ethyl-1,3-hexanediol, 1,2,6-hexanetriol, pentaerythritol, 1,6-hexanediol, 1,8-octanediol, 2,2-dimethyl-1,3-propanediol, 2,2-diethyl-1,3-propanediol, trimethylolethane, trimethylolpropane, urea, 2-imidazolidinone, thiourea, and 1,3-dimethyl-2-imidazolidinone.

The content of the humectant is preferably 10 mass % or less, more preferably 5 mass % or less, based on the total amount of the aqueous ink composition. If the humectant content is higher than 10 mass %, the drying rate of the ink may be too late, which may prevent formation of a coating by the resin particles. Therefore, the solidification and fixation of the ink on a recording medium are prevented to cause detachment of the printed matter from the printing surface.

Examples of the pH adjuster include potassium dihydrogen phosphate, sodium dihydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

Examples of the antiseptic/antifungal agent include sodium benzoate, sodium pentachlorophenol, sodium 2-pyridinethiol-1-oxide, sodium sorbate, sodium dehydroacetate, and 1,2-dibenzisothiazolin-3-one. Examples of commercial product thereof include Proxel XL2 and Proxel GXL (the mentioned above are trade names, manufactured by Avecia Ltd.) and Denicide CSA and NS-500W (the above-mentioned are trade names, manufactured by Nagase ChemteX Corp.).

Examples of a corrosion inhibitor include benzotriazole.

Examples of the chelating agent include ethylenediaminetetraacetic acid and its salts (e.g., disodium dihydrogen ethylenediaminetetraacetate).

1.8. Physical Properties of Aqueous Ink Composition

The pH of the aqueous ink composition is preferably neutral or alkaline and more preferably in the range of 7.0 to 10.0. When the pH is acidic, the storage stability and the dispersion stability of the aqueous ink composition may be deteriorated, and defects such as corrosion of metal parts used in the ink channel of an ink jet recording apparatus tend to occur. The pH can be adjusted to neutral or alkali with the pH adjuster.

The aqueous ink composition preferably has a viscosity at 20° C. in the range of 1.5 to 15 mPa·s. In this range, the discharge stability of the ink can be ensured in the first step described below.

The aqueous ink composition preferably has a surface tension at 25° C. of 20 to 40 mN/m, more preferably 25 to 35 mN/m. In this range, the discharge stability of the ink can be ensured in the first step described below, and appropriate wettability to non-ink-absorbing or low-ink-absorbing recording media can be ensured.

1.9. Method of Producing Aqueous Ink Composition

The aqueous ink composition of the invention can be obtained by mixing the above-described materials in an appropriate order and removing impurities by, for example, filtration, as necessary. In the production of the aqueous ink composition, it is preferred to uniformly disperse the coloring agent in an aqueous solvent in advance and then mix the dispersion with other components, due to the easiness of handling.

The materials are preferably mixed by sequentially adding each of the materials in a container equipped with a stirring device such as a mechanical stirrer or a magnetic stirrer. The filtration can be performed by, for example, centrifugal filtration or filter filtration, as necessary.

2. Printing Process

Next, each step of the printing process by an ink jet recording system in the preferred printing process using the aqueous ink composition of the invention will be described in detail.

2.1. First Step

The first step in the preferred printing process using the aqueous ink composition of the invention is a step of discharging droplets of the aqueous ink composition onto a recording medium by an ink jet recording system to form an image.

The ink jet recording system may be any method as long as it is a system that discharges aqueous ink composition droplets from a fine nozzle and let the droplets adhere to a recording medium. Examples of the ink jet recording system include the following four systems.

A first system is a so-called electrostatic attraction system: recording is performed by applying a strong electric field between a nozzle and an acceleration electrode disposed ahead of the nozzle to sequentially eject ink droplets from the nozzle and supplying printing information signals to deflection electrodes while the ink droplets are traveling between the deflection electrodes; or by ejecting ink droplets depending on printing information signals without deflecting the ink droplets.

A second system is a system in which ink droplets are forcedly ejected by applying a pressure to the ink solution with a small-sized pump and mechanically vibrating a nozzle with, for example, a quartz oscillator. In this system, recording is performed by charging the ejected ink droplets at the time of ejection and applying printing information signals to deflection electrodes while the ink droplets are traveling between the deflection electrodes.

A third system is a system using a piezoelectric element: recording is performed by simultaneously applying a pressure and a printing information signal to an ink solution by the piezoelectric element to eject ink droplets.

A fourth system is a system in which the volume of an ink solution is sharply expanded by an effect of thermal energy, and recording is performed by heating the ink solution with a microelectrode depending on the printing information signal to form foam for ejecting ink droplets.

Any recording medium may be used according to requirement. In particular, in the printing process by an ink jet recording system using the aqueous ink composition of the invention, non-ink-absorbing or low-ink-absorbing recording media can be suitably used. Examples of the non-ink-absorbing recording medium include plastic films not subjected to surface treatment for ink jet printing (i.e., not having an ink absorbing layer), and base materials, such as paper, provided with plastic coatings or plastic films thereon. Examples of the plastic used herein include polyvinyl chloride, polyethylene terephthalate, polycarbonate, polystyrene, polyurethane, polyethylene, and polypropylene. Examples of the low-ink-absorbing recording medium include printing paper such as art paper, coated paper, and mat paper.

In this specification, the phrase "non-ink-absorbing or low-ink-absorbing recording medium" refers to a "recording medium that absorbs 10 mL/m$^2$ or less water from the initial contact with water until when 30 msec$^{1/2}$ has elapsed, when measured by a Bristow method". The Bristow method is most commonly used as a method for measuring the amount of liquid absorbed in a short period of time and is also employed by Japan Technical Association of the Pulp and Paper Industry (JAPAN TAPPI). The details of this test method are described in Standard No. 51 "Paper and Paperboard—Liquid Absorbency Test Method—Bristow Method" in JAPAN TAPPI Paper and Pulp Test Methods, 2000 Edition".

2.2. Second Step

In the printing process using the aqueous ink composition of the invention, it is preferred to perform a second step for drying the aqueous ink composition on a recording medium at least either during the first step or after the first step. By performing the second step, the liquid solvents (specifically water, the glycol ether, and the C4-8 1,2-alkyldiol) contained in the aqueous ink composition adhering on the recording medium are promptly evaporated and scattered, the remaining solid content (e.g., coloring agent) is promptly fixed on the recording medium, and a coating of the resin particles and the pyrrolidone resin derivative, which is preferably contained in the aqueous ink composition, is formed. As a result, even on a non-ink-absorbing recording medium such as a plastic film not having an ink absorbing layer, a high-quality image that is low in uneven ink density and bleeding can be formed for a short time, and the dried matter of the ink adheres to the recording medium by forming a coating of the resin particles and the pyrrolidone resin derivative, which is preferably contained, to tightly fix the image on the recoding medium.

The second step is not particularly limited as long as it is a method accelerating evaporation and scattering of the liquid solvents contained in the aqueous ink composition. Examples of the method used as the second process include a method in which the recording medium is heated at least either during the first step or after the first step; a method in which blowing air to the aqueous ink composition on the recording medium after the first step; and a method in which both the methods are combined. Specifically, for example, forced-air heating, radiation heating, conduction heating, high-frequency drying, or microwave drying is preferably performed.

The temperature range of heat provided in the second step is not particularly limited as long as evaporation and scattering of the liquid solvents contained in the aqueous ink composition are accelerated, but the effect can be obtained when the temperature is 40° C. or higher, preferably in the range of 40 to 80° C., and more preferably in the range of 40 to 60° C. If the temperature is higher than 80° C., defects such as deformation may occur in some types of the recording media to cause a difficulties in transporting of the recording media after the second step or may cause defects such as shrinkage when the recording media are cooled to room temperature.

The heating time in the second step is not particularly limited as long as the liquid solvents contained in the aqueous ink composition are evaporated and scattered, and also the resin particles and the pyrrolidone resin derivative, which is preferably contained, can form a coating. The heating time can be appropriately set in consideration with the types of the liquid solvents and the resin particles to be used and the printing rate.

EXAMPLES

3. Examples

The invention will be described in detail with reference to examples below, but is not limited thereto.

3.1. Preparation of Aqueous Ink Composition
3.1.1. Preparation of Pigment Dispersion In the aqueous ink composition used in this example, a water-insoluble pigment was used as the coloring agent. The pigment was dispersed in a resin dispersant in advance, the resulting resin-dispersed pigment was added to the aqueous ink composition.

The pigment dispersion was prepared as follows: First, 7.5 parts by mass of an acrylic acid-acrylate copolymer (weight-average molecular weight: 25000, acid value: 180) serving as a resin dispersant was added to 76 parts by mass of ion-exchanged water dissolving 1.5 parts by mass of 30% ammonia aqueous solution (neutralizer) and was dissolved therein. To the resulting solution, 15 parts by mass of a pigment shown below was added, followed by dispersion treatment in a ball mill using zirconia beads for 10 hours. Then, coarse particles and impurities such as foreign particles were removed by centrifugal filtration using a centrifuge, and the concentration of the pigment was adjusted to 15 mass %. The pigments used for producing the pigment dispersions are as follows:

C.I. Pigment Black 7 (used in black pigment dispersion 1),
C.I. Pigment Yellow 74 (used in yellow pigment dispersion),
C.I. Pigment Red 122 (used in magenta pigment dispersion),
C.I. Pigment Blue 15:3 (used in cyan pigment dispersion),
C.I. Pigment Orange 43 (used in orange pigment dispersion), and
C.I. Pigment Green 36 (used in green pigment dispersion).

As the coloring agent contained in the aqueous ink composition of the example, a surface-treated pigment, the surface of which was treated to be dispersible in water, was used. The surface-treated pigment was dispersed in water, and the resulting pigment dispersion was added to the aqueous ink composition. The pigment dispersion was prepared prior to evaluation shown below. As a pigment dispersion, first, carbon black, Color Black S170 (trade name, manufactured by Degussa-Huls), was surface-treated with sodium hypochlorite to produce water-dispersible surface-treated carbon black, and then the surface-treated carbon black was dispersed in ion-exchanged water at a pigment concentration of 15 mass % to prepare black pigment dispersion 2.

3.1.2. Preparation of Aqueous Ink Composition

Aqueous ink compositions of seven colors, black 1, black 2, yellow, magenta, cyan, orange, and green, were prepared as one ink set at the material compositions shown in Table 2 using the pigment dispersions prepared in "3.1.1. Preparation of pigment dispersion" to obtain ink sets 1 to 15 having different material compositions. Each aqueous ink composition was prepared by placing the materials shown in Table 2 in a container, stirring and mixing the materials with a magnetic stirrer for 2 hours, and then removing coarse particles and impurities such as foreign particles by filtration through a membrane filter with a pore diameter of 5μm. Note that the numerical values shown in Table 2 all represent mass % and that ion-exchanged water was added in an amount that the total amount of the ink was 100 mass %.

3.1.2.1. Preparation 1 of Aqueous Ink Composition

Aqueous ink compositions of seven colors, black 1, black 2, yellow, magenta, cyan, orange, and green, were prepared as one ink set at the material compositions shown in Table 2 using the pigment dispersions prepared in "3.1.1. Preparation of pigment dispersion" to obtain ink sets 1 to 15 having different material compositions. Each aqueous ink composition was prepared by placing the materials shown in Table 2 in a container, stirring and mixing the materials with a magnetic stirrer for 2 hours, and then removing coarse particles and impurities such as foreign particles by filtration through a membrane filter with a pore diameter of 5 μm. Note that the numerical values shown in Table 2 all represent mass % and that ion-exchanged water was added in an amount that the total amount of the ink was 100 mass %.

TABLE 2

| Material | Ink set composition Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Pigment dispersion | 30 | 30 | 30 | 30 | 30 | 30 | 30 | 30 | 30 | 30 | 30 | 30 | 30 | 30 | 33.3 |
| Styrene-acrylic acid copolymer emulsion dispersion <Tg: 50° C., | 4 | 5 | 10 | 10 | 2 | 2 | 0.2 | 25 | 16 | 0.1 | — | 4 | 4 | 4 | — |

TABLE 2-continued

|  | Ink set composition Example | | | | | | | | | | | | | | |
|---|---|---|---|---|---|---|---|---|---|---|---|---|---|---|---|
| Material | 1 | 2 | 3 | 4 | 5 | 6 | 7 | 8 | 9 | 10 | 11 | 12 | 13 | 14 | 15 |
| 50% dispersion> (polymer particles) Polyethylene wax emulsion <35% dispersion> (wax particles) | 3 | 5 | 10 | 14 | 1.5 | 1.5 | 0.3 | 7.14 | 11.4 | 0.1 | — | 3 | 3 | 3 | — |
| Tripropylene glycol monomethyl ether (glycol ether, HLB value: 8.0) | 3 | — | — | — | — | — | — | — | 6 | — | 3 | — | — | — | — |
| Triethylene glycol monohexyl ether (glycol ether, HLB value: 7.0) | — | 3 | — | — | — | — | — | — | 6 | — | — | — | — | — | — |
| Ethylene glycol mono-2-ethylhexyl ether (glycol ether, HLB value: 5.4) | — | — | 2 | — | 1 | — | 0.1 | — | — | — | — | — | — | — | 4 |
| Diethylene glycol mono-2-ethylhexyl ether (glycol ether, HLB value: 5.8) | — | — | — | 2 | — | 1 | — | 0.1 | — | — | — | — | — | — | — |
| Triethylene glycol monobutyl ether (glycol ether, HLB value: 8.5) | — | — | — | — | — | — | — | — | — | — | — | — | 3 | — | — |
| Diethylene glycol monododecyl ether (glycol ether, HLB value: 3.8) | — | — | — | — | — | — | — | — | — | — | — | — | — | 0.8 | — |
| 1,2-Hexanediol (1,2-alkyldiol) | 8 | 5 | 4 | 8 | 4 | 5 | 0.5 | 0.5 | 20 | 3 | 8 | 8 | 8 | 8 | 5 |
| 2-Pyrrolidone (pyrrolidone derivative) | — | — | 5 | 2 | 4 | 5 | 1 | 1 | 3 | 5 | — | — | — | — | — |

TABLE 2-continued

| Material | Ink set composition Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Propylene glycol (polyol) | — | — | — | 10 | 10 | 8 | 5 | 5 | 2 | 5 | — | — | — | — | — |
| Diethylene glycol (polyol) | — | — | — | — | — | — | 5 | 5 | — | 5 | — | — | — | — | 2 |
| Glycerin (humectant) | — | — | — | — | — | — | — | — | — | — | — | — | — | — | 10 |
| Trimethylol propane (humectant) | — | — | — | — | — | — | — | — | — | — | — | — | — | — | 3 |
| BYK-348 (silicone-based surfactant) | — | — | — | 0.5 | 0.5 | 0.5 | 0.5 | 0.5 | 0.5 | 0.5 | — | — | — | — | — |
| Surfynol DF110D (acetylene glycol-based surfactant) | — | — | — | — | 0.2 | 0.2 | — | — | 0.2 | — | — | — | — | — | — |
| Surfynol 104 (acetylene glycol-based surfactant) | — | — | — | — | — | — | 0.1 | — | — | — | — | — | — | — | 0.3 |
| Olfine E1010 (acetylene glycol-based surfactant) | — | — | — | — | — | — | — | 0.5 | — | — | — | — | — | — | 0.7 |
| Polyvinyl pyrrolidone K15 (pyrrolidone resin derivative) | — | — | — | — | 1 | — | 0.1 | — | 10 | — | — | — | — | — | — |
| Luviskol Plus <40% ethanol solution> (pyrrolidone resin derivative) | — | — | — | — | — | 2.5 | — | 0.25 | — | 25 | — | — | — | — | — |
| Triethanolamine (pH adjuster) | 0.1 | 0.1 | 0.1 | 0.1 | 0.1 | 0.1 | 0.1 | 0.1 | 0.1 | 0.1 | 0.1 | 0.1 | 0.1 | 0.1 | 0.5 |
| Ethylenediaminetetraacetate (chelating agent) | 0.05 | 0.05 | 0.05 | 0.05 | 0.05 | 0.05 | 0.05 | 0.05 | 0.05 | 0.05 | 0.05 | 0.05 | 0.05 | 0.05 | — |
| Benzotriazole (anti-corrosion agent) | 0.02 | 0.02 | 0.02 | 0.02 | 0.02 | 0.02 | 0.02 | 0.02 | 0.02 | 0.02 | 0.02 | 0.02 | 0.02 | 0.02 | — |
| Ion-exchanged water | balance | balance | balance | balance | balance | balance | balance | balance | balance | balance | balance | balance | balance | balance | balance |

3.1.2.2. Preparation 2 of Aqueous Ink Composition

Aqueous ink compositions of six colors, black, yellow, magenta, cyan, orange, and green, were prepared as one ink set at the material compositions shown in Table 3 using the pigment dispersions prepared in "3.1.1. Preparation of pigment dispersion" to obtain ink sets 16 to 24 having different material compositions. Each aqueous ink composition was prepared by placing the materials shown in Table 3 in a container, stirring and mixing the materials with a magnetic stirrer for 2 hours, and then removing coarse particles and impurities such as foreign particles by filtration through a membrane filter with a pore diameter of 5 μm. Note that the numerical values shown in Table 3 all represent mass % and that ion-exchanged water was added in an amount that the total amount of the ink was 100 mass %.

TABLE 3

| | Ink set composition | | | | | | | | |
|---|---|---|---|---|---|---|---|---|---|
| | Example | | | | | Comparative Example | | | |
| Material | 16 | 17 | 18 | 19 | 20 | 21 | 22 | 23 | 24 |
| Pigment dispersion | 30 | 30 | 30 | 30 | 30 | 30 | 30 | 30 | 30 |
| Tripropylene glycol monomethyl ether (glycol ether, HLB value: 8.0) | — | — | — | 6 | — | — | 3 | — | — |
| Triethylene glycol monohexyl ether (glycol ether, HLB value: 7.0) | — | — | — | — | 6 | — | — | — | — |
| Ethylene glycol mono-2-ethylhexyl ether (glycol ether, HLB value: 5.4) | — | 0.1 | — | — | — | — | — | — | — |
| Diethylene glycol mono-2-ethylhexyl ether (glycol ether, HLB value: 5.8) | 1 | — | 0.1 | — | — | — | — | — | — |
| Triethylene glycol monobutyl ether (glycol ether, HLB value: 8.5) | — | — | — | — | — | — | — | 3 | — |
| Diethylene glycol monododecyl ether (glycol ether, HLB value: 3.8) | — | — | — | — | — | — | — | — | 0.8 |
| 1,2-Hexanediol (1,2-alkyldiol) | 5 | 0.5 | 0.5 | 20 | 3 | 8 | — | 8 | 8 |
| 2-Pyrrolidone (pyrrolidone derivative) | 5 | 1 | 1 | 3 | 5 | — | — | — | — |
| Propylene glycol (polyol) | 8 | 5 | 5 | 2 | 5 | — | — | — | — |
| Diethylene glycol (polyol) | — | 5 | 5 | — | 5 | — | — | — | — |
| BYK-340 (silicone-based surfactant) | 0.5 | 0.5 | 0.5 | 0.5 | 0.5 | — | — | — | — |
| Surfynol DF110D (acetylene glycol-based surfactant) | 0.2 | — | — | 0.2 | — | — | — | — | — |
| Surfynol 104 (acetylene glycol-based surfactant) | — | 0.1 | — | — | — | — | — | — | — |
| Olfine E1010 (acetylene-based surfactant) | — | — | 0.5 | — | — | — | — | — | — |
| Polyvinyl pyrrolidone K15 (pyrrolidone resin derivative) | — | 0.1 | — | 10 | — | — | — | — | — |
| Luviskol Plus <40% ethanol solution> (pyrrolidone resin derivative) | 2.5 | — | 0.25 | — | 25 | — | — | — | — |
| Styrene-acrylic acid copolymer emulsion dispersion <Tg: 50° C., 50% dispersion> (polymer particles) | 2 | 0.2 | 25 | 16 | 0.1 | — | — | — | — |
| Polyethylene wax emulsion <35% dispersion> (wax particles) | 1.5 | 0.3 | 7.14 | 11.4 | 0.1 | — | — | — | — |
| Triethanolamine (pH adjuster) | 0.1 | 0.1 | 0.1 | 0.1 | 0.1 | 0.1 | 0.1 | 0.1 | 0.1 |
| Ethylenediaminetetraacetate (chelating agent) | 0.05 | 0.05 | 0.05 | 0.05 | 0.05 | 0.05 | 0.05 | 0.05 | 0.05 |
| Benzotriazole (anticorrosion agent) | 0.02 | 0.02 | 0.02 | 0.02 | 0.02 | 0.02 | 0.02 | 0.02 | 0.02 |
| Ion-exchanged water | Balance | Balance | Balance | Balance | Balance | Balance | Balance | Balance | Balance |

In Tables 2 and 3, "polyvinyl pyrrolidone K15" and "Luviskol Plus (polyvinyl caprolactam)" used as pyrrolidone resin derivatives are trade names and are products of Tokyo Kasei Kogyo Co., Ltd. and BASF Japan Corp., respectively. "BYK-348" used as a silicone-based surfactant is a trade name and is a product of BYK-Chemie Japan Inc. "Surfynol DF110D", "Surfynol 104", and "Olfine E1010" used as acetylene glycol-based surfactants are trade names and are products of Nissin Chemical Industry Co., Ltd. Note that the ink set 15, which was a Comparative Example, was produced according to the ink composition (Example 7) described in JP-A-2009-235155.

3.2. Evaluation of Aqueous Ink Composition 3.2.1. Storage Stability of Aqueous Ink Composition Each ink of ink sets 1 to 24 shown in Tables 2 and 3 was sealed in a sample bottle and was left to stand under the environment of a temperature of 60° C. for 2 weeks. After the leaving, each aqueous ink composition was evaluated for storage stability by observing change in viscosity of the ink and separation/precipitation/aggregation states of the ink components. The evaluation results are shown in Table 4. The evaluation criteria are as follows:

Change in Viscosity
A: change ratio of the viscosity compared to that immediately after the preparation is less than ±5%,
B: change ratio of the viscosity compared to that immediately after the preparation is not less than ±5% but less than ±10%,
C: change ratio of the viscosity compared to that immediately after the preparation is not less than ±10% but less than ±20%, and
D: change ratio of the viscosity compared to that immediately after the preparation is not less than ±20%.

Separation/precipitation/aggregation of ink components
A: no separation/precipitation/aggregation of ink components is observed,
B: any of separation/precipitation/aggregation of ink components is slightly observed,
C: any of separation/precipitation/aggregation of ink components is clearly observed, and
D: any of separation/precipitation/aggregation of ink components is significant.

Note that since no difference was observed between different colors in the same ink set, Table 4 shows the results of storage stability of each ink set collectively.

TABLE 4

| Ink storage stability | Ink set composition | | | | | | | | | | | | | | | | | | | | | | | |
|---|---|---|---|---|---|---|---|---|---|---|---|---|---|---|---|---|---|---|---|---|---|---|---|---|
| | Example | | | | | | | | | | Comparative Example | | | | | Example | | | | | Comparative Example | | | |
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| Change in viscosity | A | A | A | A | A | A | A | A | A | B | B | B | B | D | B | A | A | A | A | B | B | B | B | D |
| Separation/ precipitation/ aggregation of ink components | A | A | A | A | A | A | A | A | B | A | B | B | C | D | B | A | A | A | B | A | B | B | C | D |

As shown in Table 4, in ink sets 1 to 10 and 16 to 20 having compositions of the aqueous ink compositions of the invention, no problems were observed in viscosity change and in separation/precipitation/aggregation of the ink components. Thus, excellent storage stability was confirmed. On the other hand, ink sets 11 to 15 and 21 to 24 having compositions of the aqueous ink compositions of Comparative Examples were inferior in viscosity change or in any or all of separation/ precipitation/aggregation of the ink components.

3.3. Evaluation of Printing
3.3.1. Evaluation of Bleeding in Printed Matter

As recording media, plain paper P (trade name, manufactured by Fuji Xerox Co., Ltd.) as a medium that well absorbs ink; Cold Laminate Film PG-50L (trade name, manufactured by Lami Corp.), which is a non-ink-absorbing polyethylene terephthalate film; and OK Top Coat+ (trade name, manufactured by Oji Paper Co., Ltd.), which is a low-ink-absorbing semi-gloss coated paper, were used.

As the printer for an ink jet recording system, an ink jet printer, PX-G930 (trade name, manufactured by Seiko Epson Corp., nozzle resolution: 180 dpi), equipped with a temperature variable heater at the paper guiding portion, was used. This evaluation was performed in a laboratory under room temperature (25° C.) conditions.

Any one of ink sets 1 to 15 was set to the ink jet printer PX-G930, and printing was performed on Cold Laminate Film PG-50L (trade name, manufactured by Lami Corp.), which is a non-ink-absorbing polyethylene terephthalate film, and on OK Top Coat+ (trade name, manufactured by Oji Paper Co., Ltd.), which is a low-ink-absorbing semi-gloss coated paper. Any one of ink sets 16 to 24 was set to the ink jet printer PX-G930, and printing was performed on plain paper P (trade name, manufactured by Fuji Xerox Co., Ltd.) as a medium that well absorbs ink; Cold Laminate Film PG-50L (trade name, manufactured by Lami Corp.), which is a non-ink-absorbing polyethylene terephthalate film; and OK Top Coat+ (trade name, manufactured by Oji Paper Co., Ltd.), which is a low-ink-absorbing semi-gloss coated paper. A printing pattern that could be printed with a duty in the range of 50% to 100% at 10% intervals was produced so that different color inks were in contact with each other or overlapped each other at a resolution of 360 dpi in the vertical direction and 360 dpi in the lateral direction and was used. Printing conditions were set to five levels by setting the heater of the printer to "none (room temperature (25° C.) at the printing surface)", "40° C. at the printing surface", "60° C. at the printing surface", "80° C. at the printing surface", or "100° C. at the printing surface". Furthermore, drying treatment was performed by blowing air with a temperature of 25° C. (room temperature), 40° C., 60° C., or 80° C. at a degree of blowing strength of any of three levels, windless, moderate wind, and strong wind, to each printed matter during the printing or immediately after the printing. In the blowing strengths, the "moderate wind" refers to a condition of blowing air at a wind velocity of about 2 to 5 m/sec at the recording medium surface, and the "strong wind" similarly refers to a condition of blowing air at a wind velocity of about 6 to 10 m/sec. The blowing time immediately after printing was one minute.

Bleeding in monochromatic and multi-color printed matters printed under the above-described conditions was visually investigated. The results are shown in Tables 5 to 8. The evaluation criteria of bleeding in printed matters are as follows:

A: no bleeding is observed even at a duty of 80% or more,
B: no bleeding is observed until a duty of 70%,
C: no bleeding is observed until a duty of 60%, and
D: bleeding is observed even at a duty of 60% or less.

Table 5 shows the results when the printer heater temperature during printing was room temperature (25° C.), and Tables 6, 7, and 8 show the results at printer heater temperature of 40° C., 60° C., and 80° C., respectively. Note that in "3.3.1. Evaluation of bleeding in printed matter", since little difference was observed between the results of "Cold Laminate Film PG-50L" and "OK Top Coat+", both results are collectively shown in Tables 4 to 7.

TABLE 5

Bleeding results in printer heater setting during printing: none (room temperature (25° C.) at printing surface)

| | | Ink set composition | | | | | | | | | | | | | | |
|---|---|---|---|---|---|---|---|---|---|---|---|---|---|---|---|---|
| | | Example | | | | | | | | | | Comparative Example | | | | |
| | Blow setting | 1 | 2 | 3 | 4 | 5 | 6 | 7 | 8 | 9 | 10 | 11 | 12 | 13 | 14 | 15 |
| Room temperature (25° C.) | windless | B | B | B | B | A | B | B | B | B | B | D | D | D | C | C |
| | moderate wind | B | B | B | B | A | A | B | B | B | B | D | D | C | C | C |
| | strong wind | B | B | B | A | A | A | B | B | A | A | C | C | C | B | B |
| 40° C. | windless | B | B | B | A | A | B | B | B | B | B | D | D | D | C | C |
| | moderate wind | B | B | B | A | A | A | B | B | B | B | C | D | C | C | B |

TABLE 5-continued

| | | | | | | | | | | | | | | | | |
|---|---|---|---|---|---|---|---|---|---|---|---|---|---|---|---|---|
| 60° C. | strong wind | A | A | A | A | A | A | A | A | A | A | C | C | C | B | B |
| | windless | B | B | B | B | A | B | B | B | B | B | D | D | D | C | C |
| | moderate wind | B | A | A | A | A | A | A | A | A | A | C | C | B | B | B |
| 80° C. | strong wind | A | A | A | A | A | A | A | A | A | A | B | B | B | B | B |
| | windless | B | B | B | B | A | B | B | B | B | B | D | D | D | C | C |
| | moderate wind | A | A | A | A | A | A | A | A | A | A | B | B | B | B | B |
| | strong wind | A | A | A | A | A | A | A | A | A | A | B | B | B | A | A |

(1) Use of plain paper P:
Bleeding results in printer heater setting during printing: none (room temperature (25° C.) at printing surface)

| | | Ink set composition | | | | | | | | |
|---|---|---|---|---|---|---|---|---|---|---|
| | | Example | | | | | Comparative Example | | | |
| | Blow setting | 16 | 17 | 18 | 19 | 20 | 21 | 22 | 23 | 24 |
| Room temperature (25° C.) | windless | A | B | B | B | B | C | C | C | C |
| | moderate wind | A | B | B | A | B | C | C | C | C |
| | strong wind | A | B | B | A | A | C | C | C | B |
| 40° C. | windless | A | B | B | B | B | C | C | C | C |
| | moderate wind | A | B | B | A | A | C | C | C | B |
| | strong wind | A | A | A | A | A | B | B | C | B |
| 60° C. | windless | A | B | B | B | B | C | C | C | C |
| | moderate wind | A | A | A | A | A | C | C | C | B |
| | strong wind | A | A | A | A | A | B | B | B | B |
| 80° C. | windless | A | B | B | B | B | C | C | C | C |
| | moderate wind | A | A | A | A | A | B | B | C | B |
| | strong wind | A | A | A | A | A | B | B | B | B |

(2) Use of cold laminate film PG-50L, OK Top Coat+:
Bleeding results in printer heater setting during printing: none (room temperature (25° C.) at printing surface)

| | | Ink set composition | | | | | | | | |
|---|---|---|---|---|---|---|---|---|---|---|
| | | Example | | | | | Comparative Example | | | |
| | Blow setting | 16 | 17 | 18 | 19 | 20 | 21 | 22 | 23 | 24 |
| Room temperature (25° C.) | windless | B | B | B | B | B | D | D | D | D |
| | moderate wind | A | B | B | B | B | D | D | D | C |
| | strong wind | A | B | B | A | A | D | C | C | C |
| 40° C. | windless | B | B | B | B | B | D | D | D | D |
| | moderate wind | A | B | B | B | B | D | C | C | C |
| | strong wind | A | A | A | A | A | C | C | C | B |
| 60° C. | windless | B | B | B | B | B | D | D | D | D |
| | moderate wind | A | A | A | A | A | C | C | C | B |
| | strong wind | A | A | A | A | A | C | C | C | B |
| 80° C. | windless | B | B | B | B | B | D | D | D | D |
| | moderate wind | A | A | A | A | A | C | C | B | B |
| | strong wind | A | A | A | A | A | C | B | B | B |

TABLE 6

Bleeding results in printer heater setting during printing: 40° C. at printing surface

| | | Ink set composition | | | | | | | | | | | | | |
|---|---|---|---|---|---|---|---|---|---|---|---|---|---|---|---|
| | | Example | | | | | | | | | Comparative Example | | | | |
| | Blow setting | 1 | 2 | 3 | 4 | 5 | 6 | 7 | 8 | 9 | 10 | 11 | 12 | 13 | 14 | 15 |
| Room temperature (25° C.) | windless | B | B | B | A | A | A | B | B | B | B | D | D | C | C | C |
| | moderate wind | B | B | B | A | A | A | B | B | B | A | C | D | C | C | B |
| | strong wind | A | A | A | A | A | A | B | A | A | C | C | C | B | B |
| 40° C. | windless | B | B | B | A | A | A | B | B | B | B | D | D | C | C | C |
| | moderate wind | B | A | A | A | A | A | B | B | B | A | C | C | B | B | B |
| | strong wind | A | A | A | A | A | A | A | A | A | B | B | B | B | B |
| 60° C. | windless | B | B | B | A | A | A | B | B | B | B | D | D | C | C | C |
| | moderate wind | A | A | A | A | A | A | A | A | A | A | C | B | B | B | B |
| | strong wind | A | A | A | A | A | A | A | A | A | A | B | B | B | A | A |
| 80° C. | windless | B | B | B | A | A | A | B | B | B | B | D | C | C | C |
| | moderate wind | A | A | A | A | A | A | A | A | A | A | C | B | B | B | B |
| | strong wind | A | A | A | A | A | A | A | A | A | A | B | B | B | A | A |

TABLE 6-continued

(1) Use of plain paper P:
Bleeding results in printer heater setting during printing: 40° C. at printing surface

| Blow setting | | Example 16 | 17 | 18 | 19 | 20 | Comparative Example 21 | 22 | 23 | 24 |
|---|---|---|---|---|---|---|---|---|---|---|
| Room temperature (25° C.) | windless | A | A | A | A | A | C | C | C | C |
| | moderate wind | A | A | A | A | A | C | C | C | B |
| | strong wind | A | A | A | A | A | C | B | C | B |
| 40° C. | windless | A | A | A | A | A | C | C | C | C |
| | moderate wind | A | A | A | A | A | C | B | C | B |
| | strong wind | A | A | A | A | A | B | B | B | B |
| 60° C. | windless | A | A | A | A | A | C | C | C | C |
| | moderate wind | A | A | A | A | A | B | B | C | B |
| | strong wind | A | A | A | A | A | B | B | B | B |
| 80° C. | windless | A | A | A | A | A | C | C | C | C |
| | moderate wind | A | A | A | A | A | B | B | B | B |
| | strong wind | A | A | A | A | A | B | B | B | A |

(2) Use of cold laminate film PG-50L, OK Top Coat+:
Bleeding results in printer heater setting during printing: 40° C. at printing surface

| Blow setting | | Example 16 | 17 | 18 | 19 | 20 | Comparative Example 21 | 22 | 23 | 24 |
|---|---|---|---|---|---|---|---|---|---|---|
| Room temperature (25° C.) | windless | A | B | B | B | B | D | D | D | C |
| | moderate wind | A | B | B | B | A | D | C | C | C |
| | strong wind | A | A | B | A | A | C | C | C | C |
| 40° C. | windless | A | B | B | B | B | D | D | D | B |
| | moderate wind | A | A | B | B | A | C | C | C | C |
| | strong wind | A | A | A | A | A | C | C | C | B |
| 60° C. | windless | A | B | B | B | B | D | D | D | D |
| | moderate wind | A | A | A | A | A | C | C | C | B |
| | strong wind | A | A | A | A | A | C | B | B | B |
| 80° C. | windless | A | B | B | B | B | D | D | D | C |
| | moderate wind | A | A | A | A | A | C | B | B | B |
| | strong wind | A | A | A | A | A | C | B | B | A |

TABLE 7

Bleeding results in printer heater setting during printing: 60° C. at printing surface

| Blow setting | | Example 1 | 2 | 3 | 4 | 5 | 6 | 7 | 8 | 9 | 10 | Comparative Example 11 | 12 | 13 | 14 | 15 |
|---|---|---|---|---|---|---|---|---|---|---|---|---|---|---|---|---|
| Room temperature (25° C.) | windless | B | A | A | A | A | A | B | B | B | B | C | C | C | C | C |
| | moderate wind | A | A | A | A | A | A | B | B | A | A | C | B | B | B | B |
| | strong wind | A | A | A | A | A | A | A | A | A | A | B | B | B | B | B |
| 40° C. | windless | B | A | A | A | A | A | B | B | B | B | C | C | C | C | C |
| | moderate wind | A | A | A | A | A | A | A | A | A | A | C | B | B | B | B |
| | strong wind | A | A | A | A | A | A | A | A | A | A | B | B | B | B | B |
| 60° C. | windless | B | A | A | A | A | A | B | B | B | B | C | C | C | C | C |
| | moderate wind | A | A | A | A | A | A | A | A | A | A | C | B | B | B | B |
| | strong wind | A | A | A | A | A | A | A | A | A | A | B | B | A | A | A |
| 80° C. | windless | B | A | A | A | A | A | B | B | B | B | C | C | C | C | C |
| | moderate wind | A | A | A | A | A | A | A | A | A | A | B | B | B | A | A |
| | strong wind | A | A | A | A | A | A | A | A | A | A | B | B | A | A | A |

TABLE 7-continued

(1) Use of plain paper P:
Bleeding results in printer heater setting during printing: 60° C. at printing surface

| Blow setting | | Example 16 | 17 | 18 | 19 | 20 | Comparative Example 21 | 22 | 23 | 24 |
|---|---|---|---|---|---|---|---|---|---|---|
| Room temperature (25° C.) | windless | A | A | A | A | A | C | C | C | B |
| | moderate wind | A | A | A | A | A | C | C | C | B |
| | strong wind | A | A | A | A | A | C | B | B | B |
| 40° C. | windless | A | A | A | A | A | C | C | C | B |
| | moderate wind | A | A | A | A | A | C | B | B | B |
| | strong wind | A | A | A | A | A | B | B | B | B |
| 60° C. | windless | A | A | A | A | A | C | C | C | B |
| | moderate wind | A | A | A | A | A | B | B | C | B |
| | strong wind | A | A | A | A | A | B | B | B | A |
| 80° C. | windless | A | A | A | A | A | C | C | C | B |
| | moderate wind | A | A | A | A | A | B | B | B | B |
| | strong wind | A | A | A | A | A | B | B | B | A |

(2) Use of cold laminate film PG-50L, OK Top Coat+:
Bleeding results in printer heater setting during printing: 60° C. at printing surface

| Blow setting | | Example 16 | 17 | 18 | 19 | 20 | Comparative Example 21 | 22 | 23 | 24 |
|---|---|---|---|---|---|---|---|---|---|---|
| Room temperature (25° C.) | windless | A | B | B | B | B | D | C | C | C |
| | moderate wind | A | B | B | A | A | C | C | C | C |
| | strong wind | A | A | A | A | A | C | C | C | B |
| 40° C. | windless | A | B | B | B | B | D | C | C | C |
| | moderate wind | A | A | A | A | A | C | C | C | B |
| | strong wind | A | A | A | A | A | C | B | B | B |
| 60° C. | windless | A | B | B | B | B | D | C | C | C |
| | moderate wind | A | A | A | A | A | C | C | B | B |
| | strong wind | A | A | A | A | A | C | B | B | A |
| 80° C. | windless | A | B | B | B | B | D | C | C | C |
| | moderate wind | A | A | A | A | A | C | B | B | A |
| | strong wind | A | A | A | A | A | B | B | B | A |

TABLE 8

Bleeding results in printer heater setting during printing: 80° C. at printing surface

| Blow setting | | Example 1 | 2 | 3 | 4 | 5 | 6 | 7 | 8 | 9 | 10 | Comparative Example 11 | 12 | 13 | 14 | 15 |
|---|---|---|---|---|---|---|---|---|---|---|---|---|---|---|---|---|
| Room temperature (25° C.) | windless | B | A | A | A | A | A | B | B | B | B | C | C | C | C | B |
| | moderate wind | A | A | A | A | A | A | A | B | A | A | C | B | B | B | B |
| | strong wind | A | A | A | A | A | A | A | A | A | A | B | B | B | B | B |
| 40° C. | windless | B | A | A | A | A | A | B | B | B | B | C | C | C | C | B |
| | moderate wind | A | A | A | A | A | A | A | A | A | A | C | B | B | B | B |
| | strong wind | A | A | A | A | A | A | A | A | A | A | B | B | B | A | A |
| 60° C. | windless | B | A | A | A | A | A | B | B | B | B | C | C | C | C | B |
| | moderate wind | A | A | A | A | A | A | A | A | A | A | B | B | B | B | A |
| | strong wind | A | A | A | A | A | A | A | A | A | A | B | A | A | A | A |
| 80° C. | windless | B | A | A | A | A | A | B | B | B | B | C | C | C | C | B |
| | moderate wind | A | A | A | A | A | A | A | A | A | A | B | A | A | A | A |
| | strong wind | A | A | A | A | A | A | A | A | A | A | B | A | A | A | A |

TABLE 8-continued (1) Use of plain paper P:
Bleeding results in printer heater setting during printing: 80° C. at printing surface

|  |  | Ink set composition |  |  |  |  |  |  |  |  |
|---|---|---|---|---|---|---|---|---|---|---|
|  |  | Example |  |  |  |  | Comparative Example |  |  |  |
| Blow setting |  | 16 | 17 | 18 | 19 | 20 | 21 | 22 | 23 | 24 |
| Room temperature (25° C.) | windless | A | A | A | A | A | C | B | C | B |
|  | moderate wind | A | A | A | A | A | C | B | B | B |
|  | strong wind | A | A | A | A | A | B | B | B | B |
| 40° C. | windless | A | A | A | A | A | C | B | B | C |
|  | moderate wind | A | A | A | A | A | B | B | B | B |
|  | strong wind | A | A | A | A | A | B | B | B | A |
| 60° C. | windless | A | A | A | A | A | C | B | C | B |
|  | moderate wind | A | A | A | A | A | B | B | B | A |
|  | strong wind | A | A | A | A | A | B | A | B | A |
| 80° C. | windless | A | A | A | A | A | C | B | C | B |
|  | moderate wind | A | A | A | A | A | B | B | B | A |
|  | strong wind | A | A | A | A | A | B | A | B | A |

(2) Use of cold laminate film PG-50L, OK Top Coat+:
Bleeding results in printer heater setting during printing: 80° C. at printing surface

|  |  | Ink set composition |  |  |  |  |  |  |  |  |
|---|---|---|---|---|---|---|---|---|---|---|
|  |  | Example |  |  |  |  | Comparative Example |  |  |  |
| Blow setting |  | 16 | 17 | 18 | 19 | 20 | 21 | 22 | 23 | 24 |
| Room temperature (25° C.) | windless | A | B | B | B | B | C | C | C | C |
|  | moderate wind | A | A | B | A | A | C | C | C | B |
|  | strong wind | A | A | A | A | A | C | B | B | B |
| 40° C. | windless | A | B | B | B | B | C | C | C | C |
|  | moderate wind | A | A | A | A | A | C | C | B | B |
|  | strong wind | A | A | A | A | A | C | B | B | A |
| 60° C. | windless | A | B | B | B | B | C | C | C | C |
|  | moderate wind | A | A | A | A | A | C | B | B | A |
|  | strong wind | A | A | A | A | A | B | B | B | A |
| 80° C. | windless | A | B | B | B | B | C | C | C | C |
|  | moderate wind | A | A | A | A | A | B | B | B | A |
|  | strong wind | A | A | A | A | A | B | B | A | A |

As shown in Tables 4 to 7, in ink sets 1 to 10 and 16 to 20 having compositions of the aqueous ink compositions of the invention, printed matters having low bleeding were obtained. Furthermore, printed matters having further less bleeding were obtained by performing the second step (drying step), which is a preferred printing process. Note that even if the composition was the aqueous ink composition of the invention, printed matters having much bleeding were obtained in some cases when the second step (drying step) was performed under inappropriate conditions. However, such bleeding could be reduced by appropriately adjusting the drying temperature and other conditions. On the other hand, in ink sets 11 to 15 and 21 to 24 having the aqueous ink compositions of Comparative Examples, even if the second step (drying step), which is a preferred printing process, was performed, the printed matters had much bleeding, and it was difficult to reduce the bleeding by controlling the drying temperature. Note that when the printing was performed by setting the printer heater temperature at 100° C., the recording medium was distorted because of the too high temperature provided to the recording medium. As a result, in many cases, the printing medium could not be transported, and printing could not be performed. Even if printing could be performed, many of the recording media were distorted in the process of being cooled to room temperature to give inadequate printed matters. Therefore, the results at a printer heater temperature of 100° C. were not shown.

3.3.2. Evaluation of Uneven Ink Density of Printed Matter

As the recording media, plain paper P (trade name, manufactured by Fuji Xerox Co., Ltd.) as a medium that well absorbs ink; Cold Laminate Film PG-50L (trade name, manufactured by Lami Corp.), which is a non-ink-absorbing polyethylene terephthalate film; and OK Top Coat+ (trade name, manufactured by Oji Paper Co., Ltd.), which is a low-ink-absorbing semi-gloss coated paper, were used.

As the printer for an ink jet recording system, an ink jet printer, PX-G930 (trade name, manufactured by Seiko Epson Corp., nozzle resolution: 180 dpi), equipped with a temperature variable heater at the paper guiding portion, was used. This evaluation was performed in a laboratory under room temperature (25° C.) conditions.

Any one of ink sets 1 to 15 was set to the ink jet printer PX-G930, and printing was performed on Cold Laminate Film PG-50L (trade name, manufactured by Lami Corp.), which is a non-ink-absorbing polyethylene terephthalate film, and on OK Top Coat+ (trade name, manufactured by Oji Paper Co., Ltd.), which is a low-ink-absorbing semi-gloss coated paper. Any one of ink sets 16 to 24 was set to the ink jet printer PX-G930, and printing was performed on plain paper P (trade name, manufactured by Fuji Xerox Co., Ltd.) as a medium that well absorbs ink; Cold Laminate Film PG-50L (trade name, manufactured by Lami Corp.), which is a non-ink-absorbing polyethylene terephthalate film; and OK Top Coat+ (trade name, manufactured by Oji Paper Co., Ltd.), which is a low-ink-absorbing semi-gloss coated paper. A printing pattern that could be printed with a duty in the range of 50% to 100% at 10% intervals was produced at a resolution of 360 dpi in the vertical direction and 360 dpi in the lateral direction and was used. Furthermore, drying treatment was performed by blowing air with a temperature of 25° C. (room temperature), 40° C., 60° C., or 80° C. at a degree of blowing strength of any of three levels, windless, moderate wind, and strong wind, to each printed matter during the printing or immediately after the printing. In the blowing strengths, the "moderate wind" refers to a condition of blowing air at a wind velocity of about 2 to 5 m/sec at the recording medium surface, and the "strong wind" similarly refers to a condition of blowing air at a wind velocity of about 6 to 10 m/sec. The blowing time immediately after printing was one minute. Printing conditions were set to five levels by setting the heater of the printer to "none (room temperature (25° C.) at the printing surface)", "40° C. at the printing surface", "60° C. at the printing surface", "80° C. at the printing surface", or "100° C. at the printing surface".

Uneven ink density in printed matters printed under the above-described conditions was visually investigated. The results are shown in Tables 9 to 12. The evaluation criteria of uneven ink density in printed matters are as follows:

A: no uneven ink density is observed even at a duty of 80% or more,
B: no uneven ink density is observed until a duty of 70%,
C: no uneven ink density is observed until a duty of 60%, and
D: uneven ink density is observed even at a duty of 60% or less.

Table 9 shows the results when the printer heater temperature was 25° C. (room temperature), and Tables 10, 11, and 12 show the results at printer heater temperature of 40° C., 60° C., and 80° C., respectively. Note that in "3.3.2. Evaluation of uneven ink density of printed matter", since little difference was observed between the results of "Cold Laminate Film PG-50L" and "OK Top Coat+", both results are collectively shown in Tables 9 to 12.

TABLE 9

Uneven ink density results in printer heater setting during printing: none (room temperature (25° C.) at printing surface)

| | | Ink set composition | | | | | | | | | | | | | | |
|---|---|---|---|---|---|---|---|---|---|---|---|---|---|---|---|---|
| | | Example | | | | | | | | | | Comparative Example | | | | |
| Blow setting | | 1 | 2 | 3 | 4 | 5 | 6 | 7 | 8 | 9 | 10 | 11 | 12 | 13 | 14 | 15 |
| Room temperature (25° C.) | windless | B | B | B | B | A | B | B | B | B | B | D | D | D | C | C |
| | moderate wind | B | B | B | B | A | A | B | B | B | B | D | D | C | C | C |
| | strong wind | A | A | A | A | A | A | B | B | A | A | C | C | C | C | B |
| 40° C. | windless | B | B | B | B | A | B | B | B | B | B | D | D | D | C | C |
| | moderate wind | B | B | B | A | A | A | B | B | B | B | C | D | C | C | C |
| | strong wind | A | A | A | A | A | A | A | A | A | A | C | C | C | B | B |
| 60° C. | windless | B | B | B | B | A | B | B | B | B | B | D | D | D | C | C |
| | moderate wind | B | B | A | A | A | A | A | A | A | A | C | C | B | B | B |
| | strong wind | A | A | A | A | A | A | A | A | A | A | B | B | B | B | B |
| 80° C. | windless | B | B | B | B | A | B | B | B | B | B | D | D | D | C | C |
| | moderate wind | B | A | A | A | A | A | A | A | A | A | B | B | B | B | B |
| | strong wind | A | A | A | A | A | A | A | A | A | A | B | B | B | A | A |

(1) Use of plain paper P:
Uneven ink density results in printer heater setting during printing: none (room temperature (25° C.) at printing surface)

| | | Ink set composition | | | | | | | | |
|---|---|---|---|---|---|---|---|---|---|---|
| | | Example | | | | | Comparative Example | | | |
| Blow setting | | 16 | 17 | 18 | 19 | 20 | 21 | 22 | 23 | 24 |
| Room temperature (25° C.) | windless | A | B | B | B | B | C | C | C | C |
| | moderate wind | A | B | B | A | B | C | C | C | C |
| | strong wind | A | B | B | A | A | C | C | C | B |
| 40° C. | windless | A | B | B | B | B | C | C | C | C |
| | moderate wind | A | B | B | A | A | C | C | C | B |
| | strong wind | A | A | A | A | A | B | B | C | B |
| 60° C. | windless | A | B | B | B | B | C | C | C | C |
| | moderate wind | A | A | A | A | A | C | C | C | B |
| | strong wind | A | A | A | A | A | B | B | B | B |
| 80° C. | windless | A | B | B | B | B | C | C | C | C |
| | moderate wind | A | A | A | A | A | B | B | C | B |
| | strong wind | A | A | A | A | A | B | B | B | B |

TABLE 9-continued (2) Use of cold laminate film PG-50L, OK Top Coat+:
Uneven ink density results in printer heater setting during printing:
none (room temperature (25° C.) at printing surface)

| | | Ink set composition | | | | | | | | |
| --- | --- | --- | --- | --- | --- | --- | --- | --- | --- | --- |
| | | Example | | | | | Comparative Example | | | |
| Blow setting | | 16 | 17 | 18 | 19 | 20 | 21 | 22 | 23 | 24 |
| Room temperature | windless | B | B | B | B | B | D | D | D | D |
| (25° C.) | moderate wind | A | B | B | B | B | D | D | D | C |
| | strong wind | A | B | B | A | A | D | C | C | C |
| 40° C. | windless | B | B | B | B | B | D | D | D | D |
| | moderate wind | A | B | B | B | B | D | C | C | C |
| | strong wind | A | A | A | A | A | C | C | C | B |
| 60° C. | windless | B | B | B | B | B | D | D | D | D |
| | moderate wind | A | A | A | A | A | C | C | C | B |
| | strong wind | A | A | A | A | A | C | C | C | B |
| 80° C. | windless | B | B | B | B | B | D | D | D | D |
| | moderate wind | A | A | A | A | A | C | C | B | B |
| | strong wind | A | A | A | A | A | C | B | B | B |

TABLE 10

Uneven ink density results in printer heater setting during printing: 40° C. at printing surface

| | | Ink set composition | | | | | | | | | | | | | |
| --- | --- | --- | --- | --- | --- | --- | --- | --- | --- | --- | --- | --- | --- | --- | --- |
| | | Example | | | | | | | | | Comparative Example | | | | |
| Blow setting | | 1 | 2 | 3 | 4 | 5 | 6 | 7 | 8 | 9 | 10 | 11 | 12 | 13 | 14 | 15 |
| Room | windless | B | B | B | B | A | A | B | B | B | B | D | D | D | C | C |
| temperature | moderate wind | B | B | B | A | A | A | B | B | B | A | D | D | C | C | B |
| (25° C.) | strong wind | A | A | A | A | A | A | B | A | A | C | C | C | C | B |
| 40° C. | windless | B | B | B | B | A | A | B | B | B | B | D | D | D | C | C |
| | moderate wind | B | B | A | A | A | A | A | B | B | A | C | D | C | C | B |
| | strong wind | A | A | A | A | A | A | A | A | A | A | C | C | B | B | B |
| 60° C. | windless | B | B | B | B | A | A | B | B | B | B | D | D | D | C | C |
| | moderate wind | B | A | A | A | A | A | A | A | A | A | B | B | B | B | B |
| | strong wind | A | A | A | A | A | A | A | A | A | A | B | B | B | B | A |
| 80° C. | windless | B | B | B | B | A | A | B | B | B | B | D | D | D | C | C |
| | moderate wind | A | A | A | A | A | A | A | A | A | A | B | B | B | B | B |
| | strong wind | A | A | A | A | A | A | A | A | A | A | B | B | B | A | A |

(1) Use of plain paper P:
Uneven ink density results in printer heater setting during printing: 40° C. at printing surface

| | | Ink set composition | | | | | | | | |
| --- | --- | --- | --- | --- | --- | --- | --- | --- | --- | --- |
| | | Example | | | | | Comparative Example | | | |
| Blow setting | | 16 | 17 | 18 | 19 | 20 | 21 | 22 | 23 | 24 |
| Room temperature | windless | A | A | A | A | A | C | C | C | C |
| (25° C.) | moderate wind | A | A | A | A | A | C | C | C | B |
| | strong wind | A | A | A | A | A | C | B | C | B |
| 40° C. | windless | A | A | A | A | A | C | C | C | C |
| | moderate wind | A | A | A | A | A | C | B | C | B |
| | strong wind | A | A | A | A | A | B | B | B | B |
| 60° C. | windless | A | A | A | A | A | C | C | C | C |
| | moderate wind | A | A | A | A | A | B | B | C | B |
| | strong wind | A | A | A | A | A | B | B | B | B |
| 80° C. | windless | A | A | A | A | A | C | C | C | C |
| | moderate wind | A | A | A | A | A | B | B | B | B |
| | strong wind | A | A | A | A | A | B | B | B | A |

TABLE 10-continued (2) Use of cold laminate film PG-50L, OK Top Coat+:
Uneven ink density results in printer heater setting during printing: 40° C. at printing surface

| Blow setting | | Ink set composition |||||||||
|---|---|---|---|---|---|---|---|---|---|---|
| | | Example ||||| Comparative Example ||||
| | | 16 | 17 | 18 | 19 | 20 | 21 | 22 | 23 | 24 |
| Room temperature (25° C.) | windless | A | B | B | B | B | D | D | D | C |
| | moderate wind | A | B | B | B | A | D | C | C | C |
| | strong wind | A | A | B | A | A | C | C | C | C |
| 40° C. | windless | A | B | B | B | B | D | D | D | D |
| | moderate wind | A | A | B | B | A | C | C | C | B |
| | strong wind | A | A | A | A | A | C | C | C | B |
| 60° C. | windless | A | B | B | B | B | D | D | D | C |
| | moderate wind | A | A | A | A | A | C | C | C | B |
| | strong wind | A | A | A | A | A | C | B | B | B |
| 80° C. | windless | A | B | B | B | B | D | D | D | C |
| | moderate wind | A | A | A | A | A | C | B | B | B |
| | strong wind | A | A | A | A | A | C | B | B | A |

TABLE 11

Uneven ink density results in printer heater setting during printing: 60° C. at printing surface

| Blow setting | | Ink set composition |||||||||||||||
|---|---|---|---|---|---|---|---|---|---|---|---|---|---|---|---|---|
| | | Example |||||||||| Comparative Example |||||
| | | 1 | 2 | 3 | 4 | 5 | 6 | 7 | 8 | 9 | 10 | 11 | 12 | 13 | 14 | 15 |
| Room temperature (25° C.) | windless | B | B | B | A | A | A | B | B | B | B | D | D | D | C | C |
| | moderate wind | B | B | A | A | A | A | B | B | A | A | C | C | C | C | B |
| | strong wind | A | A | A | A | A | A | A | A | A | A | C | C | B | C | B |
| 40° C. | windless | B | B | B | A | A | A | B | B | B | B | D | D | D | C | C |
| | moderate wind | B | A | A | A | A | A | A | A | A | A | C | C | B | C | B |
| | strong wind | A | A | A | A | A | A | A | A | A | A | C | C | B | B | B |
| 60° C. | windless | B | B | B | A | A | A | B | B | B | B | D | D | D | C | C |
| | moderate wind | A | A | A | A | A | A | A | A | A | A | B | B | B | B | B |
| | strong wind | A | A | A | A | A | A | A | A | A | A | B | B | B | B | A |
| 80° C. | windless | B | B | B | A | A | A | B | B | B | B | D | D | D | C | C |
| | moderate wind | A | A | A | A | A | A | A | A | A | A | B | B | B | B | A |
| | strong wind | A | A | A | A | A | A | A | A | A | A | B | B | A | A | A |

(1) Use of plain paper P:
Uneven ink density results in printer heater setting during printing: 60° C. at printing surface

| Blow setting | | Ink set composition |||||||||
|---|---|---|---|---|---|---|---|---|---|---|
| | | Example ||||| Comparative Example ||||
| | | 16 | 17 | 18 | 19 | 20 | 21 | 22 | 23 | 24 |
| Room temperature (25° C.) | windless | A | A | A | A | A | C | C | C | B |
| | moderate wind | A | A | A | A | A | C | C | C | B |
| | strong wind | A | A | A | A | A | C | B | B | B |
| 40° C. | windless | A | A | A | A | A | C | C | C | B |
| | moderate wind | A | A | A | A | A | C | B | B | B |
| | strong wind | A | A | A | A | A | B | B | B | B |
| 60° C. | windless | A | A | A | A | A | C | C | C | B |
| | moderate wind | A | A | A | A | A | B | B | B | B |
| | strong wind | A | A | A | A | A | B | B | B | A |
| 80° C. | windless | A | A | A | A | A | C | C | C | B |
| | moderate wind | A | A | A | A | A | B | B | B | B |
| | strong wind | A | A | A | A | A | B | B | B | A |

TABLE 11-continued (2) Use of cold laminate film PG-50L, OK Top Coat+:
Uneven ink density results in printer heater setting during printing: 60° C. at printing surface

| Blow setting | | Ink set composition |||||||||
|---|---|---|---|---|---|---|---|---|---|---|
| | | Example ||||| Comparative Example ||||
| | | 16 | 17 | 18 | 19 | 20 | 21 | 22 | 23 | 24 |
| Room temperature (25° C.) | windless | A | B | B | B | B | D | C | C | C |
| | moderate wind | A | B | B | A | A | C | C | C | C |
| | strong wind | A | A | A | A | A | C | C | C | B |
| 40° C. | windless | A | B | B | B | B | D | C | C | C |
| | moderate wind | A | A | A | A | A | C | C | C | B |
| | strong wind | A | A | A | A | A | C | B | B | B |
| 60° C. | windless | A | B | B | B | B | D | C | C | C |
| | moderate wind | A | A | A | A | A | C | C | B | B |
| | strong wind | A | A | A | A | A | C | B | B | A |
| 80° C. | windless | A | B | B | B | B | D | C | C | C |
| | moderate wind | A | A | A | A | A | C | B | B | A |
| | strong wind | A | A | A | A | A | B | B | B | A |

TABLE 12

Uneven ink density results in printer heater setting during printing: 80° C. at printing surface

| Blow setting | | Ink set composition ||||||||||||||
|---|---|---|---|---|---|---|---|---|---|---|---|---|---|---|---|
| | | Example |||||||||| Comparative Example ||||
| | | 1 | 2 | 3 | 4 | 5 | 6 | 7 | 8 | 9 | 10 | 11 | 12 | 13 | 14 | 15 |
| Room temperature (25° C.) | windless | B | B | A | A | A | A | B | B | B | B | C | C | C | C | B |
| | moderate wind | B | A | A | A | A | A | A | B | A | A | C | C | C | C | B |
| | strong wind | A | A | A | A | A | A | A | A | A | A | B | B | B | B | B |
| 40° C. | windless | B | B | A | A | A | A | B | B | B | B | C | C | C | C | B |
| | moderate wind | A | A | A | A | A | A | A | A | A | A | C | C | B | B | B |
| | strong wind | A | A | A | A | A | A | A | A | A | A | B | B | B | B | A |
| 60° C. | windless | B | B | A | A | A | A | B | B | B | B | C | C | C | C | B |
| | moderate wind | A | A | A | A | A | A | A | A | A | A | B | B | B | B | A |
| | strong wind | A | A | A | A | A | A | A | A | A | A | B | B | B | B | A |
| 80° C. | windless | B | B | A | A | A | A | B | B | B | B | C | C | C | C | B |
| | moderate wind | A | A | A | A | A | A | A | A | A | A | B | B | B | B | A |
| | strong wind | A | A | A | A | A | A | A | A | A | A | B | B | A | A | A |

(1) Use of plain paper P:
Uneven ink density results in printer heater setting during printing: 80° C. at printing surface

| Blow setting | | Ink set composition |||||||||
|---|---|---|---|---|---|---|---|---|---|---|
| | | Example ||||| Comparative Example ||||
| | | 16 | 17 | 18 | 19 | 20 | 21 | 22 | 23 | 24 |
| Room temperature (25° C.) | windless | A | A | A | A | A | C | B | C | B |
| | moderate wind | A | A | A | A | A | C | B | B | B |
| | strong wind | A | A | A | A | A | B | B | B | B |
| 40° C. | windless | A | A | A | A | A | C | B | C | B |
| | moderate wind | A | A | A | A | A | B | B | B | B |
| | strong wind | A | A | A | A | A | B | B | B | A |
| 60° C. | windless | A | A | A | A | A | C | B | C | B |
| | moderate wind | A | A | A | A | A | B | B | B | A |
| | strong wind | A | A | A | A | A | B | A | B | A |
| 80° C. | windless | A | A | A | A | A | C | B | C | B |
| | moderate wind | A | A | A | A | A | B | B | B | A |
| | strong wind | A | A | A | A | A | B | A | B | A |

TABLE 12-continued (2) Use of cold laminate film PG-50L, OK Top Coat+:
Uneven ink density results in printer heater setting during printing: 80° C. at printing surface

| | | Ink set composition | | | | | | | | |
|---|---|---|---|---|---|---|---|---|---|---|
| | | Example | | | | | Comparative Example | | | |
| Blow setting | | 16 | 17 | 18 | 19 | 20 | 21 | 22 | 23 | 24 |
| Room temperature | windless | A | B | B | B | B | C | C | C | C |
| (25° C.) | moderate wind | A | A | B | A | A | C | C | C | B |
| | strong wind | A | A | A | A | A | C | B | B | B |
| 40° C. | windless | A | B | B | B | B | C | C | C | C |
| | moderate wind | A | A | A | A | A | C | C | B | B |
| | strong wind | A | A | A | A | A | C | B | B | A |
| 60° C. | windless | A | B | B | B | B | C | C | C | C |
| | moderate wind | A | A | A | A | A | C | B | B | A |
| | strong wind | A | A | A | A | A | B | B | B | A |
| 80° C. | windless | A | B | B | B | B | C | C | C | C |
| | moderate wind | A | A | A | A | A | B | B | B | A |
| | strong wind | A | A | A | A | A | B | B | A | A |

As shown in Tables 9 to 12, in ink sets 1 to 10 and 16 to 20 having compositions of the aqueous ink compositions of the invention, printed matters having low uneven ink density were obtained. Furthermore, printed matters having further less uneven ink density were obtained by performing the second step (drying step), which is a preferred printing process. Note that even if the composition was the aqueous ink composition of the invention, printed matters having much uneven ink density were obtained in some cases when the second step (drying step) was performed under inappropriate conditions. However, such uneven ink density could be reduced by appropriately adjusting the drying temperature and other conditions. On the other hand, in ink sets 11 to 15 and 21 to 24 having the aqueous ink compositions of Comparative Examples, printed matters having much uneven ink density were obtained. Even if the second step (drying step) was performed, the printed matters had much uneven ink density, and it was difficult to reduce the uneven ink density by controlling the drying temperature. Note that when the printing was performed by setting the printer heater temperature at 100° C., the recording medium was distorted because of the too high temperature provided to the recording medium. As a result, in many cases, the printing medium could not be transported, and printing could not be performed. Even if printing could be performed, many of the recording media were distorted in the process of being cooled to room temperature to give inadequate printed matters. Therefore, the results at a printer heater temperature of 100° C. were not shown.

3.3.3. Evaluation of Abrasion Resistance of Printed Matter

As the recording media, Cold Laminate Film PG-50L (trade name, manufactured by Lami Corp.), which is a non-ink-absorbing polyethylene terephthalate film; and OK Top Coat+ (trade name, manufactured by Oji Paper Co., Ltd.), which is a low-ink-absorbing semi-gloss coated paper, were used.

As the printer for an ink jet recording system, an ink jet printer, PX-G930 (trade name, manufactured by Seiko Epson Corp., nozzle resolution: 180 dpi), equipped with a temperature variable heater at the paper guiding portion, was used. This evaluation was performed in a laboratory under room temperature (25° C.) conditions.

Any one of ink sets 1 to 15 was set to the ink jet printer PX-G930, and printing was performed on the above-mentioned recording media. As a printing pattern, a solid pattern was produced at a resolution of 360 dpi in the vertical direction and 360 dpi in the lateral direction. Furthermore, drying treatment was performed by blowing air with a temperature of 25° C. (room temperature), 40° C., 60° C., or 80° C. at a degree of blowing strength of any of three levels, windless, moderate wind, and strong wind, to each printed matter during the printing or immediately after the printing. In the blowing strengths, the "moderate wind" refers to a condition of blowing air at a wind velocity of about 2 to 5 m/sec at the recording medium surface, and the "strong wind" similarly refers to a condition of blowing air at a wind velocity of about 6 to 10 m/sec. The blowing time immediately after printing was one minute. Printing conditions were set to five levels by setting the heater of the printer to "none (room temperature (25° C.) at the printing surface)", "40° C. at the printing surface", "60° C. at the printing surface", "80° C. at the printing surface", or "100° C. at the printing surface".

The printed matters were left to stand in the laboratory under conditions of room temperature for 5 hours, and the printed surfaces were rubbed with a cotton cloth 10 times under a load of 200 g with a Gakushin-type rubbing fastness tester AB-301 (trade name, manufactured by Tester Sangyo Co., Ltd.). Abrasion resistance was evaluated by confirming conditions of detachment of printed surfaces and of ink transfer to the cotton cloth. The evaluation criteria of the abrasion resistance are as follows:

A: no ink detachment and ink transfer to cotton cloth is observed after rubbing 10 times, B: slight ink detachment or ink transfer to cotton cloth is observed after rubbing 10 times, C: ink detachment or ink transfer to cotton cloth is observed after rubbing 10 times, and D: ink detachment or ink transfer to cotton cloth is observed before the completion of rubbing 10 times.

Table 13 shows the results when the printer heater temperature was 25° C. (room temperature), and Tables 14, 15, and 16 show the results at printer heater temperature of 40° C., 60° C., and 80° C., respectively. Note that in "3.3.3. Evaluation of abrasion resistance of printed matter", since little difference was observed between the results of "Cold Laminate Film PG-50L" and "OK Top Coat+", both results are collectively shown in Tables 13 to 16.

TABLE 13

Abrasion resistance evaluation results in printer heater setting during printing:
none (room temperature (25° C.) at printing surface)

| | | Ink set composition |||||||||| | | | | |
|---|---|---|---|---|---|---|---|---|---|---|---|---|---|---|---|
| | | Example |||||||||| Comparative Example ||||| 
| Blow setting || 1 | 2 | 3 | 4 | 5 | 6 | 7 | 8 | 9 | 10 | 11 | 12 | 13 | 14 | 15 |
| Room temperature (25° C.) | windless | B | B | B | B | B | B | C | B | B | C | D | C | C | C | D |
| | moderate wind | B | B | B | B | B | B | C | B | A | B | D | C | C | C | D |
| | strong wind | B | B | B | B | B | B | B | A | A | B | D | C | C | C | C |
| 40° C. | windless | B | B | B | B | B | B | C | B | B | C | D | C | C | C | D |
| | moderate wind | A | A | A | A | A | A | B | A | A | B | D | C | C | C | C |
| | strong wind | A | A | A | A | A | A | B | A | A | B | C | C | C | C | C |
| 60° C. | windless | B | B | B | B | B | B | C | B | B | C | D | C | C | C | D |
| | moderate wind | A | A | A | A | A | A | B | A | A | B | C | B | B | B | C |
| | strong wind | A | A | A | A | A | A | B | A | A | B | C | B | B | B | B |
| 80° C. | windless | B | B | B | B | B | B | C | B | B | C | D | C | C | C | D |
| | moderate wind | A | A | A | A | A | A | B | A | A | B | C | B | B | B | B |
| | strong wind | A | A | A | A | A | A | B | A | A | B | B | B | B | B | B |

TABLE 14

Abrasion resistance evaluation results in printer heater setting during printing:
40° C. at printing surface

| | | Ink set composition |||||||||| | | | | |
|---|---|---|---|---|---|---|---|---|---|---|---|---|---|---|---|
| | | Example |||||||||| Comparative Example |||||
| Blow setting || 1 | 2 | 3 | 4 | 5 | 6 | 7 | 8 | 9 | 10 | 11 | 12 | 13 | 14 | 15 |
| Room temperature (25° C.) | windless | B | B | B | B | B | B | C | B | B | C | D | C | C | C | C |
| | moderate wind | B | B | B | B | A | A | B | A | A | B | D | C | C | C | C |
| | strong wind | B | B | B | A | A | A | B | A | A | B | C | C | C | C | C |
| 40° C. | windless | B | B | B | B | B | B | C | B | B | C | D | C | C | C | C |
| | moderate wind | B | B | B | A | A | A | B | A | A | B | C | B | B | B | B |
| | strong wind | A | A | A | A | A | A | B | A | A | B | C | B | B | B | B |
| 60° C. | windless | B | B | B | B | B | B | C | B | B | C | D | C | C | C | C |
| | moderate wind | A | A | A | A | A | A | B | A | A | B | C | B | B | B | B |
| | strong wind | A | A | A | A | A | A | A | A | A | B | B | B | B | B | B |
| 80° C. | windless | B | B | B | B | B | B | C | B | B | C | D | C | C | C | C |
| | moderate wind | A | A | A | A | A | A | B | A | A | B | B | B | B | B | B |
| | strong wind | A | A | A | A | A | A | A | A | A | A | B | B | B | B | B |

TABLE 15

Abrasion resistance evaluation results in printer heater setting during printing:
60° C. at printing surface

| | | Ink set composition |||||||||| | | | | |
|---|---|---|---|---|---|---|---|---|---|---|---|---|---|---|---|
| | | Example |||||||||| Comparative Example |||||
| Blow setting || 1 | 2 | 3 | 4 | 5 | 6 | 7 | 8 | 9 | 10 | 11 | 12 | 13 | 14 | 15 |
| Room temperature (25° C.) | windless | B | B | B | B | A | A | B | A | A | B | D | C | C | C | C |
| | moderate wind | B | B | B | A | A | A | B | A | A | B | C | B | B | B | C |
| | strong wind | A | A | A | A | A | A | B | A | A | B | C | B | B | B | B |
| 40° C. | windless | B | B | B | B | A | A | B | A | A | B | D | C | C | C | C |
| | moderate wind | A | A | A | A | A | A | B | A | A | B | C | B | B | B | B |
| | strong wind | A | A | A | A | A | A | A | A | A | B | B | B | B | B | B |
| 60° C. | windless | B | B | B | B | A | A | B | A | A | B | D | C | C | C | C |
| | moderate wind | A | A | A | A | A | A | A | A | A | B | B | B | B | B | A |
| | strong wind | A | A | A | A | A | A | A | A | A | A | B | B | B | B | A |
| 80° C. | windless | B | B | B | B | A | A | B | A | A | B | D | C | C | C | C |
| | moderate wind | A | A | A | A | A | A | A | A | A | A | B | B | B | B | B |
| | strong wind | A | A | A | A | A | A | A | A | A | A | B | B | B | B | A |

TABLE 16

Abrasion resistance evaluation results in printer heater setting during printing: 80° C. at printing surface

| Blow setting | | Ink set composition | | | | | | | | | | | | | | |
|---|---|---|---|---|---|---|---|---|---|---|---|---|---|---|---|---|
| | | Example | | | | | | | | | | Comparative Example | | | | |
| | | 1 | 2 | 3 | 4 | 5 | 6 | 7 | 8 | 9 | 10 | 11 | 12 | 13 | 14 | 15 |
| Room temperature (25° C.) | windless | A | A | A | A | A | A | B | A | A | B | C | B | B | B | B |
| | moderate wind | A | A | A | A | A | A | B | A | A | B | C | B | B | B | B |
| | strong wind | A | A | A | A | A | A | A | A | A | A | B | B | B | B | B |
| 40° C. | windless | A | A | A | A | A | A | B | A | A | B | C | B | B | B | B |
| | moderate wind | A | A | A | A | A | A | A | A | A | B | B | B | B | B | B |
| | strong wind | A | A | A | A | A | A | A | A | A | A | B | B | B | B | A |
| 60° C. | windless | A | A | A | A | A | A | B | A | A | B | C | B | B | B | B |
| | moderate wind | A | A | A | A | A | A | A | A | A | A | B | B | B | B | A |
| | strong wind | A | A | A | A | A | A | A | A | A | A | B | B | B | B | A |
| 80° C. | windless | A | A | A | A | A | A | B | A | A | B | C | B | B | B | B |
| | moderate wind | A | A | A | A | A | A | A | A | A | A | B | B | B | B | A |
| | strong wind | A | A | A | A | A | A | A | A | A | A | B | B | B | B | A |

As shown in Tables 13 to 16, in ink sets 1 to 10 having compositions of the aqueous ink compositions of the invention, printed matters having excellent abrasion resistance were obtained. Furthermore, printed matters having more excellent abrasion resistance were obtained by performing the second step (drying step), which is a preferred printing process. On the other hand, in ink sets 11 to 15 having the aqueous ink compositions of Comparative Examples, printed matters inferior in abrasion resistance were obtained. Note that when the printing was performed by setting the printer heater temperature at 100° C., the recording medium was distorted because of the too high temperature provided to the recording medium. As a result, in many cases, the printing medium could not be transported, and printing could not be performed. Even if printing could be performed, many of the recording media were distorted in the process of being cooled to room temperature to give inadequate printed matters. Therefore, the results at a printer heater temperature of 100° C. were not shown.

The invention is not limited to the above-described embodiments, and various modifications are possible. For example, the invention includes configurations that are substantially the same as those described in the embodiments (for example, a configuration having the same function, method, and result, or a configuration having the same object and effect). The invention includes configurations in which portions not essential in the configurations described in the embodiments are replaced with other. The invention also includes configurations that achieve the same functions and effects or achieve the same objects of those of the configurations described in the embodiments. In addition, the invention includes configurations in which known techniques are added to the configurations described in the embodiments.

What is claimed is:

1. An aqueous ink composition for non-ink-absorbing recording medium, comprising at least a water-insoluble coloring agent, a glycol ether having an HLB value calculated by a Davies' method in the range of 4.2 to 8.0, a 1,2-alkyldiol having 4 to 8 carbon atoms, resin particles, and water, wherein the glycol ether has an alkyl group having a branched structure, and wherein the resin particles have a glass transition temperature of not lower than 30° C.

2. The aqueous ink composition according to claim 1, wherein the amount of the glycol ether is in the range of 0.1 to 6 mass % based on the total amount of the aqueous ink composition.

3. The aqueous ink composition according to claim 1, wherein the mass ratio of the 1,2-alkyldiol to the glycol ether is in the range of 0.5:1 to 5:1.

4. The aqueous ink composition according to claim 1, wherein the amount of the 1,2-alkyldiol is in the range of 0.5 to 20 mass % based on the total amount of the aqueous ink composition.

5. The aqueous ink composition according to claim 1, wherein the alkyl group of the glycol ether is a 2-ethylhexyl group.

6. The aqueous ink composition according to claim 1, further comprising a nonionic surfactant.

7. The aqueous ink composition according to claim 6, wherein the nonionic surfactant is a silicone-based surfactant and/or an acetylene glycol-based surfactant.

8. The aqueous ink composition according to claim 7, further comprising a pyrrolidone derivative.

9. The aqueous ink composition according to claim 8, further comprising a polyol.

10. The aqueous ink composition according to claim 9, further comprising a pyrrolidone resin derivative.

11. A printing process by an ink jet recording system using an aqueous ink composition according to claim 1, the process comprising at least forming an image on a recording medium by discharging droplets of the aqueous ink composition.

12. The printing process by an ink jet recording system according to claim 11, the process comprising drying the aqueous ink composition on the recording medium at least either during or after the formation of the image.

13. The printing process by an ink jet recording system according to claim 12, wherein the drying includes at least either heating the recording medium at 40 to 80° C. or blowing air having a temperature of 40 to 80° C. to the aqueous ink composition on the recording medium.

* * * * *